(12) United States Patent
Hirokawa et al.

(10) Patent No.: US 12,459,230 B2
(45) Date of Patent: Nov. 4, 2025

(54) PEEL-OFF SHEET, AND COMBINATION OF PEEL-OFF SHEET AND INTERMEDIATE TRANSFER MEDIUM

(71) Applicant: Dai Nippon Printing Co., Ltd., Tokyo (JP)

(72) Inventors: Junko Hirokawa, Tokyo (JP); Tadahiro Ishida, Tokyo (JP); Mitsuhiro Oota, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 107 days.

(21) Appl. No.: 17/757,569

(22) PCT Filed: Jan. 7, 2021

(86) PCT No.: PCT/JP2021/000412
§ 371 (c)(1),
(2) Date: Jun. 17, 2022

(87) PCT Pub. No.: WO2021/141096
PCT Pub. Date: Jul. 15, 2021

(65) Prior Publication Data
US 2023/0022367 A1  Jan. 26, 2023

(30) Foreign Application Priority Data

Jan. 8, 2020 (JP) ................................ 2020-001467
Mar. 19, 2020 (JP) ................................ 2020-049297

(51) Int. Cl.
*B32B 7/06* (2019.01)
*B32B 5/30* (2006.01)
(Continued)

(52) U.S. Cl.
CPC .................. *B32B 7/06* (2013.01); *B32B 5/30* (2013.01); *B32B 27/20* (2013.01); *B32B 27/304* (2013.01);
(Continued)

(58) Field of Classification Search
CPC .. B32B 7/06; B32B 5/30; B32B 27/20; B32B 27/304; B32B 27/306; B32B 27/36; B32B 2307/704; B41M 5/382
(Continued)

(56) References Cited

U.S. PATENT DOCUMENTS 6,803,936 B2   10/2004   Odaka et al.
10,328,734 B2   6/2019   Hayashi et al.
(Continued)

FOREIGN PATENT DOCUMENTS

CN   107249898 A   10/2017
CN   108025576 A   5/2018
(Continued)

OTHER PUBLICATIONS

Chinese Office Action (Application No. 202180008205.2) dated Oct. 27, 2023 (with English translation) (23 pages).
(Continued)

*Primary Examiner* — Betelhem Shewareged
(74) *Attorney, Agent, or Firm* — BURR PATENT LAW, PLLC

(57) ABSTRACT

The peel-off sheet according to the present disclosure includes a first substrate and a peel-off layer, wherein the peel-off layer contains a vinyl chloride-vinyl acetate copolymer and a crystalline polyester, or the peel-off sheet includes a structural component containing particles, wherein the particle size distribution of the particles contained in the structural component which is determined with a laser diffraction scattering particle size distribution ana-
(Continued)

lyzer has a maximum peak at a position of more than 0.2 μm and 5 μm or less.

20 Claims, 10 Drawing Sheets

(51) Int. Cl.
  *B32B 27/20* (2006.01)
  *B32B 27/30* (2006.01)
  *B32B 27/36* (2006.01)
  *B41M 5/382* (2006.01)

(52) U.S. Cl.
  CPC ............ *B32B 27/306* (2013.01); *B32B 27/36* (2013.01); *B41M 5/382* (2013.01); *B32B 2307/704* (2013.01)

(58) Field of Classification Search
  USPC ....................................................... 428/32.51
  See application file for complete search history.

(56) References Cited

U.S. PATENT DOCUMENTS

| | | | |
|---|---|---|---|
| 10,427,441 B2 | 10/2019 | Yoda et al. | |
| 11,104,172 B2 | 8/2021 | Yoda et al. | |
| 2003/0174197 A1* | 9/2003 | Odaka | B41M 5/38257 347/175 |
| 2006/0275671 A1* | 12/2006 | Eto | B42D 25/328 430/1 |
| 2018/0065393 A1* | 3/2018 | Yoda | B41M 5/41 |
| 2019/0023048 A1 | 1/2019 | Yoda et al. | |
| 2023/0022367 A1* | 1/2023 | Hirokawa | B41M 5/38257 |

FOREIGN PATENT DOCUMENTS

| | | |
|---|---|---|
| JP | 2003-326865 A | 11/2003 |
| JP | 2010-235769 A | 10/2010 |
| KR | 10-2017-0131356 A | 11/2017 |
| KR | 10-2018-0119658 A | 11/2018 |
| WO | 2016/158497 A1 | 10/2016 |
| WO | 2017/159870 A1 | 9/2017 |

OTHER PUBLICATIONS

English translation of the International Preliminary Report on Patentability (Chapter I) dated Jul. 21, 2022 (Application No. PCT/JP2021/000412).

International Search Report and Written Opinion (Application No. PCT/JP2021/000412) dated Mar. 23, 2021 (with English translation).

Chinese Office Action (Application No. 202180008205.2) dated Mar. 23, 2023 (with English translation) (35 pages).

Korean Office Action (with English translation) dated Jun. 25, 2024 (Application No. 10-2022-7026926).

* cited by examiner

APPLICATION REGION (PRESSED REGION)

PRESSING DIRECTION

APPLICATION REGION (PRESSED REGION)

PRESSING DIRECTION

PEEL-OFF SHEET, AND COMBINATION OF PEEL-OFF SHEET AND INTERMEDIATE TRANSFER MEDIUM

CROSS-REFERENCE TO RELATED APPLICATIONS

This patent application claims the benefit of priority to Japanese Patent Application No. 2020-001467 filed on Jan. 8, 2020 and Japanese Patent Application No. 2020-049297 filed on Mar. 19, 2020, which are incorporated herein by reference in their entirety.

TECHNICAL FIELD

The present disclosure relates to a peel-off sheet, a combination of the peel-off sheet and an intermediate transfer medium, and a method for producing a printed material in which the combination is used.

BACKGROUND ART

Various thermal transfer recording methods are known in the related art.

For example, a thermofusible transfer recording method is known in which a printed material is produced by superimposing a thermal transfer sheet including a fusion transfer coloring layer on a transfer-receiving article and heating the thermal transfer sheet with a thermal head included in a thermal transfer printer to transfer the coloring layer to the transfer-receiving article and thereby form an image.

A sublimation thermal transfer recording method is also known in which a printed material is produced by superimposing a thermal transfer sheet including a sublimation transfer coloring layer containing a sublimation dye on a transfer-receiving article and heating the thermal transfer sheet with a thermal head included in a thermal transfer printer to transfer the sublimation dye contained in the coloring layer to the transfer-receiving article and thereby form a sublimation image.

In some cases, it may be difficult to form an image by the sublimation thermal transfer recording method depending on, for example, the shape of the surface of a transfer-receiving article. In such a case, a printed material is produced using an intermediate transfer medium that includes a transfer layer. Specifically, a method for producing a printed material, the method including forming an image on a transfer layer included in an intermediate transfer medium and transferring the transfer layer on which the image is formed to a transfer-receiving article, is known.

For example, a printed material is produced by heating a thermal transfer sheet that includes a sublimation transfer coloring layer containing a sublimation dye to transfer the sublimation dye contained in the coloring layer to a receiving layer constituting a transfer layer included in an intermediate transfer medium and thereby form an image and subsequently heating the intermediate transfer medium to transfer the transfer layer to a transfer-receiving article.

Depending on the intended application of the printed material, it may be desired that the transfer layer be selectively transferred from the intermediate transfer medium. In PTL 1, a transfer layer can be selectively transferred to a transfer-receiving article by removing (peeling off), using a peel-off sheet that includes a peel-off layer, a part of the transfer layer from an intermediate transfer medium with the peel-off layer before the transfer layer of the intermediate transfer medium is transferred to the transfer-receiving article.

Specifically, a receiving layer included in the intermediate transfer medium is superimposed on the peel-off layer included in the peel-off sheet. Subsequently, they are heated with a thermal head or the like included in a thermal transfer printer to be thermocompression-bonded to each other. Then, the peel-off sheet is removed. As a result, a part of the transfer layer included in the intermediate transfer medium is removed.

CITATION LIST

Patent Literature

PTL 1: Japanese Unexamined Patent Application Publication No. 2003-326865

SUMMARY OF INVENTION

Technical Problem

Performing the heating with a thermal head or the like with a large amount of energy may result in the formation of wrinkles in the transfer layer included in the intermediate transfer medium and a rupture of the intermediate transfer medium.

A problem to be solved in the present disclosure is to provide a peel-off sheet having a high peel-off property with which a part of the transfer layer included in the intermediate transfer medium can be readily removed (peeled off) even in the case where the heating with a thermal head or the like is performed with a small amount of energy.

A problem to be solved in the present disclosure is to provide a combination of the above peel-off sheet and an intermediate transfer medium.

A problem to be solved in the present disclosure is to provide a method for producing a printed material in which the above combination is used.

Solution to Problem

The inventors of the present invention found that the structure described below markedly improves the peel-off property and enables the transfer layer to be readily peeled off even when the heating is performed with a small amount of energy (hereinafter, this property is referred to simply as "peel-off property").

A first peel-off sheet according to the present disclosure includes a first substrate and a peel-off layer, the peel-off layer containing a vinyl chloride-vinyl acetate copolymer and a crystalline polyester.

The first peel-off sheet according to the present disclosure may be a peel-off sheet that includes a first substrate and a peel-off layer, wherein a logarithmic damping ratio ΔE of the peel-off layer, the logarithmic damping ratio ΔE being determined by subjecting the peel-off layer to rigid-body pendulum measurement at 100° C., is 0.25 or more.

A second peel-off sheet according to the present disclosure includes
a first substrate and a peel-off layer,
the peel-off sheet including a structural component containing particles,
wherein a particle size distribution of the particles contained in the structural component, the particle size distribution being determined with a laser diffraction scattering particle size distribution analyzer, has a maximum peak at a position of more than 0.2 μm and 5 μm or less.

A combination according to the present disclosure includes
- the above-described first or second peel-off sheet, and
- an intermediate transfer medium including a second substrate and a transfer layer including at least a receiving layer.

A method for producing a printed material according to the present disclosure includes the steps of:
- providing the above-described combination;
- performing thermocompression bonding between the receiving layer and the peel-off layer in at least a part of a removal region of the intermediate transfer medium and subsequently peeling off the transfer layer disposed in the removal region from the intermediate transfer medium;
- transferring the transfer layer disposed in a non-removal region of the intermediate transfer medium to a transfer-receiving article; and
- forming an image on the receiving layer prior to or subsequent to the step of peeling off the transfer layer and prior to the step of transferring the transfer layer.

Advantageous Effects of Invention

According to the present disclosure, it is possible to provide a peel-off sheet having a high peel-off property, that is, for example, a peel-off sheet having a suitable peel-off property with which a part of the transfer layer of the intermediate transfer medium can be readily removed.

According to the present disclosure, it is possible to provide a combination of the above peel-off sheet and an intermediate transfer medium.

According to the present disclosure, it is possible to provide a method for producing a printed material in which the above combination is used.

DESCRIPTION OF EMBODIMENTS

Figure 1:
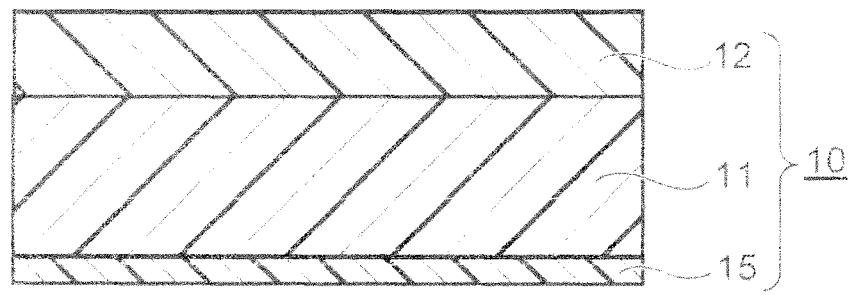
FIG. 1 is a schematic cross-sectional view of a first peel-off sheet according to an embodiment.

Embodiments of the present disclosure are described with reference to the attached drawings and the like below. The present disclosure may be implemented in various forms. The present disclosure should not be interpreted with any limitation to the contents of the embodiments described below as examples. In order to make a description about each of the drawings clearer, the width, thickness, shape, and the like of each part in the drawing may be schematically illustrated compared with the actual form. However, they are mere examples and do not limit the interpretation of the present disclosure. In the present specification and the drawings, the same reference numerals are attached to the same elements as in any one of the drawings that have been referred; thus, a detailed description thereof is appropriately omitted. For the convenience of the descriptions, terms such as "upward" and "downward" may be used. However, the directions represented by the terms may be flipped upside down. The same applies to the direction represented by the terms "left" and "right".

First and second peel-off sheets are described below. The substrate included in the first and second peel-off sheets is referred to as "first substrate", while the substrate included in the intermediate transfer medium is referred to as "second substrate".

[First Peel-Off Sheet]

A first peel-off sheet 10 according to the present disclosure includes a first substrate 11 and a peel-off layer 12 as illustrated in FIG. 1.

Figure 2:
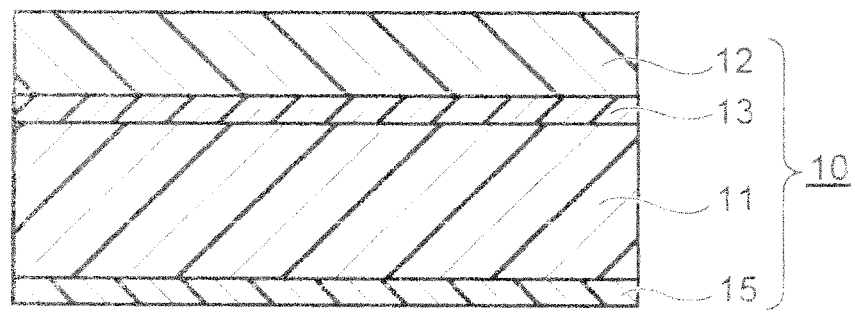
FIG. 2 is a schematic cross-sectional view of a first peel-off sheet according to an embodiment.

According to an embodiment, the peel-off sheet 10 includes a primer layer 13 interposed between the first substrate 11 and the peel-off layer 12 as illustrated in FIG. 2.

According to an embodiment, in the case where the coloring layer described below is a sublimation transfer coloring layer, the first peel-off sheet may include a primer layer (not illustrated in the drawings) interposed between the first substrate and the sublimation transfer coloring layer.

Figure 3:
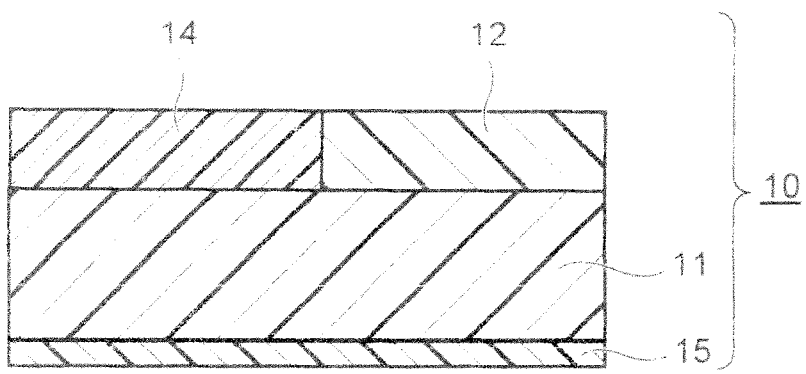
FIG. 3 is a schematic cross-sectional view of a first peel-off sheet according to an embodiment.
Figure 4:
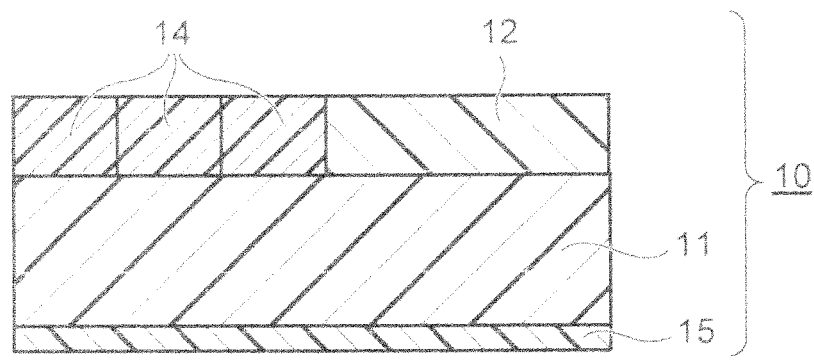
FIG. 4 is a schematic cross-sectional view of a first peel-off sheet according to an embodiment.

According to an embodiment, the peel-off sheet 10 includes a coloring layer 14 arranged on the first substrate 11 to be frame sequentially with the peel-off layer 12 as illustrated in FIG. 3. The coloring layer 14 may be constituted by a plurality of coloring layers 14 arranged to be frame sequentially as illustrated in FIG. 4.

According to an embodiment, as illustrated in FIGS. 1 to 4, the peel-off sheet 10 includes a back layer 15 disposed on a surface of the first substrate 11 which is opposite to the surface on which the peel-off layer 12 is disposed.

According to an embodiment, in the case where the coloring layer described below is a fusion transfer coloring layer, the first peel-off sheet may include a peeling layer and/or a release layer (not illustrated in the drawings) interposed between the first substrate and the fusion transfer coloring layer. In the case where the peel-off sheet includes the peeling layer and the release layer, the release layer and the peeling layer are interposed between the first substrate and the fusion transfer coloring layer in this order.

The layers included in the first peel-off sheet are each described below.

(First Substrate)

The first substrate is not limited and may be any substrate that has certain heat resistance with which the first substrate can withstand the thermal energy (e.g., the heat generated by a thermal head) applied when a transfer layer is peeled off from an intermediate transfer medium, a certain mechanical strength with which the first substrate can support the peel-off layer, etc. disposed thereon and a certain resistance to solvents.

For example, a film made of a resin material (hereinafter, such a film is referred to simply as "resin film") can be used as a first substrate. Examples of the resin material include polyesters, such as polyethylene terephthalate (PET), polybutylene terephthalate (PBT), polyethylene naphthalate (PEN), 1,4-polycyclohexylenedimethylene terephthalate, and a terephthalic acid-cyclohexanedimethanol-ethylene glycol copolymer; polyamides, such as nylon 6 and nylon 6,6; polyolefins, such as polyethylene (PE), polypropylene (PP), and polymethylpentene; vinyl resins, such as polyvinyl chloride, polyvinyl alcohol (PVA), polyvinyl acetate, a vinyl chloride-vinyl acetate copolymer, polyvinyl butyral, and polyvinylpyrrolidone (PVP); (meth)acrylic resins, such as poly(meth)acrylate and polymethyl methacrylate; imide resins, such as polyimide and polyetherimide; cellulose resins, such as cellophane, cellulose acetate, nitrocellulose, cellulose acetate propionate (CAP), and cellulose acetate butyrate (CAB); styrene resins, such as polystyrene (PS); polycarbonates; and ionomer resins.

Among the above resin materials, polyesters, such as PET and PEN, are preferable and PET is particularly preferable in consideration of heat resistance and mechanical strength.

The number of types of the resin materials that can be contained in the resin film is one or more.

In the present disclosure, the term "(meth)acryl" encompasses both "acryl" and "methacryl", and the term "(meth) acrylate" encompasses both "acrylate" and "methacrylate".

A laminate of the resin films may be used as a first substrate. The laminate of the resin films can be produced by, for example, a dry lamination method, a wet lamination method, or an extrusion method.

In the case where the first substrate is a resin film, the resin film may be either a stretched film or an unstretched film. The resin film is preferably a uniaxially or biaxially stretched film in consideration of strength.

The thickness of the first substrate is preferably 2 µm or more and 25 µm or less and is more preferably 3 µm or more and 10 µm or less. In such a case, the first substrate has a suitable mechanical strength. Moreover, thermal energy can be transferred in a suitable manner during peeling off.

(Peel-Off Layer)

The peel-off layer is a layer used for partially removing (peeling off) a transfer layer included in an intermediate transfer medium.

According to an embodiment, the peel-off layer of the first peel-off sheet contains a vinyl chloride-vinyl acetate copolymer and a crystalline polyester. This markedly enhances the peel-off property.

In the first peel-off sheet according to an embodiment, the logarithmic damping ratio $\Delta E$ measured by subjecting the peel-off layer to rigid-body pendulum measurement at 100° C. is 0.25 or more. This markedly enhances the peel-off property. Details of logarithmic damping ratio $\Delta E$ are described below.

The number of types of the vinyl chloride-vinyl acetate copolymers that can be contained in the peel-off layer is one or more. The number of types of the crystalline polyesters that can be contained in the peel-off layer is one or more.

In the present disclosure, the term "vinyl chloride-vinyl acetate copolymer" refers to a copolymer of vinyl chloride and vinyl acetate. The vinyl chloride-vinyl acetate copolymer may include, as a copolymerization unit, a constitutional unit derived from a compound other than vinyl chloride or vinyl acetate.

The proportion of the constitutional unit derived from a compound other than vinyl chloride or vinyl acetate in the vinyl chloride-vinyl acetate copolymer is preferably 10% by mass or less, is more preferably 5% by mass or less, and is further preferably 3% by mass or less, relative to 100% by mass of the copolymer.

The number-average molecular weight (Mn) of the vinyl chloride-vinyl acetate copolymer is preferably 5,000 or more and 50,000 or less and is more preferably 7,000 or more and 43,000 or less. In such a case, the peel-off property can be further markedly enhanced.

In the present disclosure, the term "Mn" refers to the value measured by gel permeation chromatography using polystyrene as a standard substance. Mn is measured by a method in accordance with JIS K 7252-3 (published in 2016).

The glass-transition temperature (Tg) of the vinyl chloride-vinyl acetate copolymer is preferably 50° C. or more and 90° C. or less and is more preferably 60° C. or more and 80° C. or less. In such a case, the peel-off property can be further markedly enhanced.

In the present disclosure, Tg is measured by differential scanning calorimetry (DSC) at a heating rate of 10° C./min in accordance with JIS K 7121.

In the case where the peel-off layer does not contain the particles described below, the content of the vinyl chloride-vinyl acetate copolymer in the peel-off layer is preferably 5 parts by mass or more and 80 parts by mass or less and is more preferably 5 parts by mass or more and 65 parts by mass or less relative to 100 parts by mass of the total content of resin materials in the peel-off layer. In such a case, the peel-off property can be further markedly enhanced while certain blocking resistance is maintained.

In the case where the peel-off layer contains the particles described below, the content of the vinyl chloride-vinyl acetate copolymer in the peel-off layer is preferably 5 parts by mass or more and 80 parts by mass or less, is more preferably 5 parts by mass or more and 65 parts by mass or less, is further preferably 5 parts by mass or more and 50 parts by mass or less, is still further preferably 5 parts by mass or more and 40 parts by mass or less, and is particularly preferably 5 parts by mass or more and 25 parts by mass or less relative to 100 parts by mass of the total content of resin materials in the peel-off layer. In such a case, the peel-off property can be further markedly enhanced while certain blocking resistance is maintained.

The above resin materials include the vinyl chloride-vinyl acetate copolymer and the crystalline polyester.

In the present disclosure, the term "crystalline polyester" refers to a polyester that has a distinctive melting peak in either of two heating steps included in a process in which the temperature is increased from −100° C. to 300° C. at 20° C./min, then reduced from 300° C. to −100° C. at 50° C./min, and subsequently increased from −100° C. to 300° C. at 20° C./min with a differential scanning calorimeter.

The polyester is preferably, for example, a copolymer of a dicarboxylic acid compound and a diol compound.

Examples of the dicarboxylic acid compound include malonic acid, succinic acid, glutaric acid, adipic acid, suberic acid, sebacic acid, dodecanedioic acid, eicosanedioic acid, pimelic acid, azelaic acid, methylmalonic acid and ethylmalonic acid, adamantanedicarboxylic acid, norbornenedicarboxylic acid, cyclohexanedicarboxylic acid, decalindicarboxylic acid, terephthalic acid, isophthalic acid, phthalic acid, 1,4-naphthalenedicarboxylic acid, 1,5-naphthalenedicarboxylic acid, 2,6-naphthalenedicarboxylic acid, 1,8-naphthalenedicarboxylic acid, 4,4'-diphenyldicarboxylic acid, 4,4'-diphenyl ether dicarboxylic acid, 5-sodium sulfoisophthalic acid, phenylindandicarboxylic acid, anthracenedicarboxylic acid, phenanthrenedicarboxylic acid, 9,9'-bis(4-carboxyphenyl)fluorene acid, and ester derivatives of the above compounds. The number of types of the dicarboxylic acid compounds used may be one or more.

Examples of the diol compound include ethylene glycol, 1,2-propanediol, 1,3-propanediol, butanediol, 2-methyl-1,3-propanediol, hexanediol, neopentyl glycol, cyclohexanedimethanol, cyclohexanediethanol, decahydronaphthalenedimethanol, decahydronaphthalenediethanol, norbornanedimethanol, norbornanediethanol, tricyclodecanedimethanol, tricyclodecaneethanol, tetracyclododecanedimethanol, tetracyclododecanediethanol, decalindimethanol, decalindiethanol, 5-methylol-5-ethyl-2-(1,1-dimethyl-2-hydroxyethyl)-1,3-dioxane, cyclohexanediol, bicyclohexyl-4,4'-diol, 2,2-bis(4-hydroxycyclohexylpropane), 2,2-bis(4-(2-hydroxyethoxy)cyclohexyl)propane, cyclopentanediol, 3-methyl-1,2-cyclopentadiol, 4-cyclopentene-1,3-diol, adamanediol, para-xylene glycol, bisphenol A, bisphenol S, styrene glycol, trimethylolpropane, and pentaerythritol. The number of types of the diol compounds used may be one or more.

The polyester may include a constitutional unit derived from a polymerization component other than the dicarboxylic acid compound or the diol compound. The proportion of the constitutional unit derived from the above polymerization component is preferably 10% by mass or less, is more preferably 5% by mass or less, and is further preferably 3% by mass or less relative to 100% by mass of the polyester.

The Mn of the crystalline polyester is preferably 10,000 or more and 50,000 or less and is more preferably 20,000 or more and 40,000 or less. In such a case, the peel-off property can be further markedly enhanced.

The Tg of the crystalline polyester is preferably −50° C. or more and 50° C. or less. In such a case, the peel-off property can be further markedly enhanced while certain blocking resistance is maintained.

In the case where the peel-off layer does not contain the particles described below, the Tg of the crystalline polyester is more preferably −15° C. or more and 20° C. or less. In the case where the peel-off layer contains the particles described below, the Tg of the crystalline polyester is more preferably −25° C. or more and 15° C. or less.

The melting point of the crystalline polyester is preferably 50° C. or more and 150° C. or less and is more preferably 80° C. or more and 120° C. or less. In such a case, the peel-off property can be further markedly enhanced.

In the present disclosure, melting point is measured by DSC at a heating rate of 20° C./min in accordance with JIS K 7121 (published in 2012).

In the case where the peel-off layer does not contain the particles described below, the content of the crystalline polyester in the peel-off layer is preferably 20 parts by mass or more and 95 parts by mass or less and is more preferably 35 parts by mass or more and 95 parts by mass or less relative to 100 parts by mass of the total content of the resin materials in the peel-off layer. In such a case, the peel-off property can be further markedly enhanced while certain blocking resistance is maintained.

In the case where the peel-off layer contains the particles described below, the content of the crystalline polyester in the peel-off layer is preferably 20 parts by mass or more and 95 parts by mass or less, is more preferably 35 parts by mass or more and 95 parts by mass or less, is further preferably 50 parts by mass or more and 95 parts by mass or less, is still further preferably 60 parts by mass or more and 95 parts by mass or less, and is particularly preferably 75 parts by mass or more and 95 parts by mass or less relative to 100 parts by mass of the total content of the resin materials in the peel-off layer. In such a case, the peel-off property can be further markedly enhanced while certain blocking resistance is maintained. Furthermore, heat resistance and preservation stability of the peel-off sheet can be further enhanced.

The resin materials include the vinyl chloride-vinyl acetate copolymer and the crystalline polyester.

In the present disclosure, the content of the crystalline polyester in the peel-off layer is preferably 20 parts by mass or more and 95 parts by mass or less, is more preferably 30 parts by mass or more and 95 parts by mass or less, and is further preferably 50 parts by mass or more and 95 parts by mass or less, relative to 100 parts by mass of the total content of the vinyl chloride-vinyl acetate copolymer and the crystalline polyester in the peel-off layer. In such a case, the peel-off property can be further markedly enhanced while the capability of the receiving layer to accept a sublimation dye is maintained. Furthermore, heat resistance and preservation stability of the peel-off sheet can be further enhanced.

The peel-off layer may contain a resin material other than the vinyl chloride-vinyl acetate copolymer or the crystalline polyester. Examples of such a resin material include an amorphous polyester, a polyolefin, a vinyl resin, a (meth)acrylic resin, an imide resin, a cellulose resin, a styrene resin, and an ionomer resin.

The content of resin materials in the peel-off layer is preferably 75% by mass or more, is more preferably 80% by mass or more and 99.5% by mass or less, and is further preferably 85% by mass or more and 99% by mass or less. In such a case, the peel-off property can be further markedly enhanced.

According to an embodiment, the peel-off layer contains particles. This enhances blocking resistance. The number of types of the particles that can be contained in the peel-off layer may be one or more.

The particles may be either organic or inorganic particles. Organic and inorganic particles may be used in combination. In consideration of blocking resistance, organic particles are preferable.

Examples of the organic particles include particles made of a resin (resin particles). Examples of the resin constituting the resin particles include a melamine resin, a benzoguanamine resin, a (meth)acrylic resin, a polyamide, a fluororesin, a phenolic resin, a styrene resin, a polyolefin, a silicone resin, and a copolymer of monomers constituting the above resins. The number of types of the resins used may be one or more.

Examples of the inorganic particles include particles of clay minerals, such as talc and kaolin; particles of carbonic acid salts, such as calcium carbonate and magnesium carbonate; particles of hydroxides, such as aluminum hydroxide and magnesium hydroxide; particles of sulfuric acid salts, such as calcium sulfate; particles of oxides, such as silica; and particles of graphite, nitre, and boron nitride.

The shape of the particles may be any of indefinite, spherical, ovoid, cylindrical, prism-like, and the like. The surfaces of the particles may be treated with a surface treatment agent, such as a silane coupling agent.

The average size of the particles is preferably 0.3 μm or more and m or less. According to an embodiment, the average size of the particles is more preferably 0.5 μm or more and 10 μm or less and is further preferably 1 μm or more and 5 μm or less. In such a case, blocking resistance can be further enhanced.

In the present disclosure, the term "average particle size" refers to volume-average particle size. Average particle size is measured in accordance with JIS Z 8819-2.

The content of the particles in the peel-off layer is preferably 0.1 parts by mass or more and 30 parts by mass or less, is more preferably 0.1 parts by mass or more and 20 parts by mass or less, is further preferably 1 part by mass or more and 15 parts by mass or less, and is particularly preferably 5 parts by mass or more and 13 parts by mass or less, relative to 100 parts by mass of the total content of resin materials in the peel-off layer. In such a case, blocking resistance can be further enhanced while certain peel-off property is maintained.

According to an embodiment, the peel-off layer contains an additive. Examples of the additive include a filler, a plasticizer, an ultraviolet absorber, inorganic particles, organic particles, and a dispersing agent. The number of types of the additives that can be contained in the peel-off layer is one or more.

The logarithmic damping ratio ΔE measured by subjecting the peel-off layer to rigid-body pendulum measurement at 100° C. is preferably 0.25 or more, is more preferably 0.30 or more, and is further preferably 0.33 or more. In such a case, the transfer layer can be further readily peeled off even when the heating is performed with a small amount of energy. ΔE can be increased by, for example, increasing the content of the crystalline polyester in the peel-off layer. The upper limit for ΔE is not limited; ΔE is, for example, 0.50 or less and is preferably 0.45 or less.

In the present disclosure, the logarithmic damping ratio ΔE is measured in the following manner.

The peel-off sheet is cut to a size of 15 mm wide×50 mm long to provide a test sample S.

Figure 10:
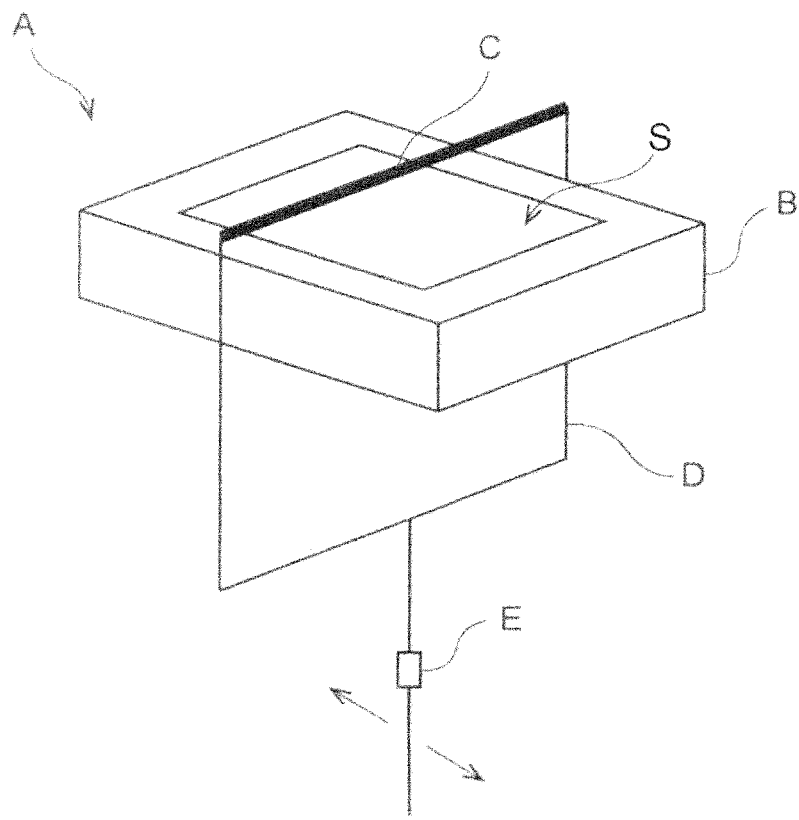
FIG. 10 is a schematic diagram illustrating a rigid-body pendulum physical property tester.

A rigid-body pendulum physical property tester A that includes a test sample temperature control stage B, a cylindrical cylinder C, a pendulum frame D, and an oscillation displacement sensor E is provided. Refer to FIG. 10. The arrow in FIG. 10 denotes the direction in which the pendulum frame D swings, which is parallel to the longitudinal direction of the test sample S fixed in place. The test sample S is fixed to the test sample temperature control stage B with the peel-off layer facing upward with a Kapton tape being adhered to a position at which the tape does not affect the measurement results. Furthermore, a temperature sensor is attached to the test sample S.

The test sample S is fixed in place such that the longitudinal direction thereof is orthogonal to the direction of the central axis of the cylindrical cylinder C. The cylindrical cylinder C is arranged to come into contact with the surface of the peel-off layer.

The temperature of the test sample temperature control stage B is increased from 25° C. to 130° C. at a heating rate of 3° C./min. The logarithmic damping ratio ΔE of the peel-off layer which is observed in this process is measured.

Specifically, the logarithmic damping ratio ΔE observed when the temperature of the peel-off layer of the test sample S reaches 100° C. is measured. The above measurement is conducted three times using different test samples; a test sample that has been used once for measurement is not used in another measurement. The average is considered as logarithmic damping ratio ΔE ($\Delta E = [\ln(A1/A2) + \ln(A2/A3) + \ldots \ln(An/An+1)]/n$, A: amplitude, n: wave number, initial amplitude A1: about 0.3 degrees), where ln represents natural logarithm.

RPT-3000W produced by A&D Company, Limited or a device comparable thereto can be used as a rigid-body pendulum physical property tester A.

Cooling/heating block CHB-100 or a device comparable thereto can be used as a test sample temperature control stage B.

Cylindrical cylinder edge RBP-060 or a device comparable thereto can be used as a cylindrical cylinder C.

FRB-100 or a device comparable thereto can be used as a pendulum frame D.

CHB-100, RBP-060, and FRB-100 above are devices or members included in RPT-3000W above.

The thickness of the peel-off layer is preferably 0.2 μm or more and 10 μm or less and is more preferably 0.4 μm or more and 5 μm or less. In such a case, the peel-off property can be further markedly enhanced.

The peel-off layer can be formed by, for example, dispersing or dissolving the above materials in water or an appropriate organic solvent to prepare a coating liquid, applying the coating liquid to the first substrate or the like by known means to form a coating film, and drying the coating film. Examples of the known means include roll coating, reverse roll coating, gravure coating, reverse gravure coating, bar coating, and rod coating.

(Primer Layer)

According to an embodiment, the first peel-off sheet includes a primer layer interposed between the first substrate and the peel-off layer. This increases the adhesion between the two layers.

In the case where the coloring layer described below is a sublimation transfer coloring layer, the first peel-off sheet may include a primer layer interposed between the coloring layer and the first substrate.

According to an embodiment, the primer layer contains a resin material. Examples of the resin material include a polyester, a vinyl resin, a polyurethane, a (meth)acrylic resin, a polyamide, a polyether, a styrene resin, and a cellulose resin. Among these, a polyester is preferable in consideration of the adhesion between the first substrate and the peel-off layer. The number of types of the resin materials that can be contained in the primer layer is one or more.

The primer layer may contain the above-described additive.

The thickness of the primer layer is, for example, 0.05 μm or more and 2.0 μm or less.

The primer layer can be formed by, for example, dispersing or dissolving the above materials in water or an appropriate organic solvent to prepare a coating liquid, applying the coating liquid to the first substrate by the known means described above to form a coating film, and drying the coating film.

(Coloring Layer)

The first peel-off sheet may include a coloring layer arranged on the first substrate to be frame sequentially with the peel-off layer. The coloring layer may be either a sublimation transfer coloring layer from which only the sublimation dye contained in the coloring layer is transferred or a fusion transfer coloring layer from which the coloring layer itself is transferred. Alternatively, the first peel-off sheet may include both sublimation transfer coloring layer and fusion transfer coloring layer.

The coloring layer contains at least one coloring material. The coloring material may be either a pigment or dye. The dye may be a sublimation dye.

Examples of the coloring material include carbon black, acetylene black, lamp black, black smoke, iron black, aniline black, silica, calcium carbonate, titanium oxide, cadmium red, cadmopone red, chromium red, vermilion, ferric oxide red, an azo pigment, alizarin lake, quinacridone, cochineal lake perylene, yellow ochre, aureolin, cadmium yellow, cadmium orange, chrome yellow, zinc yellow, naples yellow, nickel yellow, an azo pigment, greenish yellow, ultramarine, mountain blue, cobalt, phthalocyanine, anthraquinone, indigoid, cinnabar green, cadmium green, chromium green, phthalocyanine, azomethine, perylene, an aluminum pigment, and sublimation dyes, such as a diarylmethane dye, a triarylmethane dye, a thiazole dye, a merocyanine dye, a pyrazolone dye, a methine dye, an indoaniline dye, an acetophenoneazomethine dye, a pyrazoloazomethine dye, a xanthene dye, an oxazine dye, a thiazine dye, an azine dye, an acridine dye, an azo dye, a spiropyran dye, an indolinospiropyran dye, a fluoran dye, a naphthoquinone dye, an anthraquinone dye, and a quinophthalone dye.

According to an embodiment, the coloring layer contains a resin material. Examples of the resin material include a polyester, a polyamide, a polyolefin, a vinyl resin, a vinyl acetal resin, a (meth)acrylic resin, a cellulose resin, a styrene resin, a polycarbonate, a butyral resin, a phenoxy resin, and an ionomer resin. The number of types of the resin materials that can be contained in the coloring layer is one or more.

The coloring layer may contain the above-described additive.

The thickness of the coloring layer is, for example, 0.1 μm or more and 3 μm or less.

The coloring layer can be formed by, for example, dispersing or dissolving the above materials in water or an appropriate organic solvent to prepare a coating liquid, applying the coating liquid to the first substrate or the like by the known means described above to form a coating film, and drying the coating film.

(Peeling Layer)

In the case where the coloring layer is a fusion transfer coloring layer, a peeling layer can be interposed between the first substrate and the fusion transfer coloring layer. When the fusion transfer coloring layer is transferred to the receiving layer included in the intermediate transfer medium, the peeling layer is also transferred together with the fusion transfer coloring layer.

According to an embodiment, the peeling layer contains a resin material. Examples of the resin material include a polyester, a polyamide, a polyolefin, a vinyl resin, a (meth)acrylic resin, an imide resin, a cellulose resin, a styrene resin, a polycarbonate, and an ionomer resin. The number of types of the resin materials that can be contained in the peeling layer is one or more.

The content of the resin materials in the peeling layer is, for example, 50% by mass or more and 99% by mass or less.

The peeling layer may contain the above-described additive.

The thickness of the peeling layer is preferably 0.1 μm or more and 3 μm or less and is more preferably 0.3 μm or more and 1.5 μm or less. In such a case, the transferability of the coloring layer can be further enhanced.

The peeling layer can be formed by, for example, dispersing or dissolving the above materials in water or an appropriate organic solvent to prepare a coating liquid, applying the coating liquid to the first substrate or the like by the known means described above to form a coating film, and drying the coating film.

(Release Layer)

In the case where the coloring layer is a fusion transfer coloring layer, a release layer may be interposed between the first substrate and the fusion transfer coloring layer. When the fusion transfer coloring layer is transferred to the receiving layer included in the intermediate transfer medium, the release layer remains on the first substrate.

According to an embodiment, the release layer contains a resin material. Examples of the resin material include a (meth)acrylic resin, a polyurethane, an acetal resin, a polyamide, a polyester, a melamine resin, a polyol resin, a cellulose resin, and a silicone resin. The number of types of the resin materials that can be contained in the release layer is one or more.

The content of the resin materials in the release layer is, for example, 50% by mass or more and 99% by mass or less.

According to an embodiment, the release layer contains a release agent. Examples of the release agent include a fluorine compound, a phosphoric acid ester compound, a silicone oil, a higher fatty acid amide compound, metal soap, and a wax, such as a paraffin wax.

The content of the release agent in the release layer is preferably 0.1% by mass or more and 10% by mass or less and is more preferably 0.5% by mass or more and 5% by mass or less. In such a case, the transferability of the fusion transfer coloring layer can be further enhanced.

The release layer may contain the above-described additive.

The thickness of the release layer is, for example, 0.1 μm or more and 2.0 μm or less.

The release layer can be formed by, for example, dispersing or dissolving the above materials in water or an appropriate organic solvent to prepare a coating liquid, applying the coating liquid to the first substrate by the known means described above to form a coating film, and drying the coating film.

(Back Layer)

According to an embodiment, the first peel-off sheet includes a back layer disposed on a surface of the first substrate which is opposite to the surface on which the peel-off layer, etc. are disposed. This reduces the occurrence of sticking and wrinkling caused by heating.

According to an embodiment, the back layer contains a resin material. Examples of the resin material include a vinyl resin, a polyester, a polyamide, a polyolefin, a (meth)acrylic resin, a silicone resin, a polyolefin, a polyurethane, a cellulose resin, and a phenolic resin. The number of types of the resin materials that can be contained in the back layer is one or more.

The thickness of the back layer is, for example, 0.3 μm or more and 3.0 μm or less.

The back layer can be formed by, for example, dispersing or dissolving the above materials in water or an appropriate organic solvent to prepare a coating liquid, applying the coating liquid to the first substrate by the known means described above to form a coating film, and drying the coating film.

[Second Peel-Off Sheet]

A second peel-off sheet 100 according to the present disclosure includes a first substrate 1 and a peel-off layer 3 disposed on one of the surfaces of the first substrate 1 as illustrated in FIGS. 11 to 17. FIGS. 11 to 17 are schematic cross-sectional views of examples of the second peel-off sheet 100.

Figure 14:
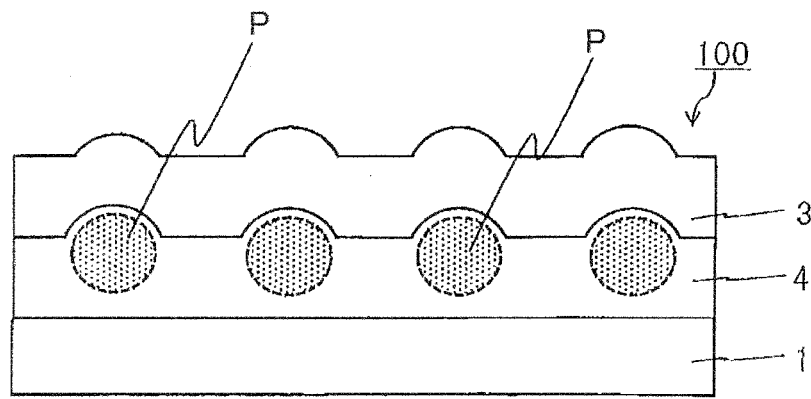
FIG. 14 is a schematic cross-sectional view of an example of the second peel-off sheet.

According to an embodiment, the peel-off sheet 100 includes an intermediate layer 4 interposed between the first substrate 1 and the peel-off layer 3 as illustrated in FIG. 14.

Figure 17:
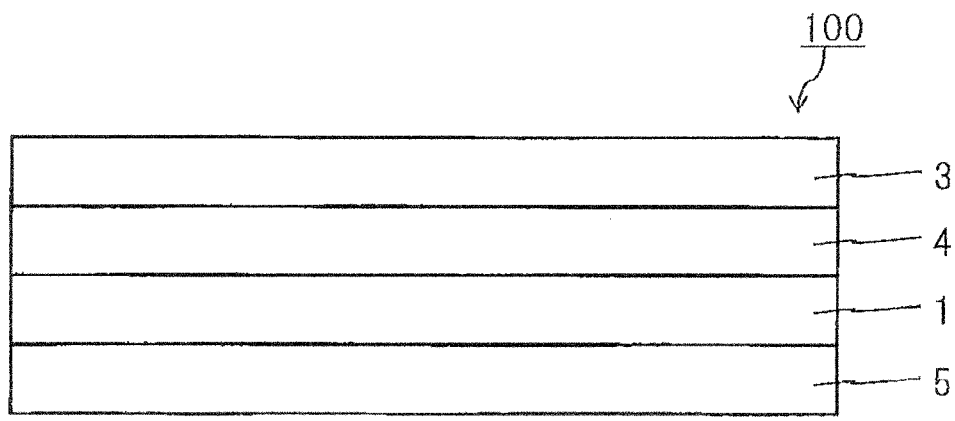
FIG. 17 is a schematic cross-sectional view of an example of the second peel-off sheet.

According to an embodiment, the peel-off sheet 100 includes a back layer 5 disposed on the other surface of the first substrate 1 as illustrated in FIG. 17.

The peel-off sheet 100 is not limited to the forms illustrated in the drawings; the forms illustrated in the drawings may be combined with one another appropriately as needed. The peel-off sheet 100 may include a structural component other than the first substrate 1 or the peel-off layer 3.

Figure 19A:
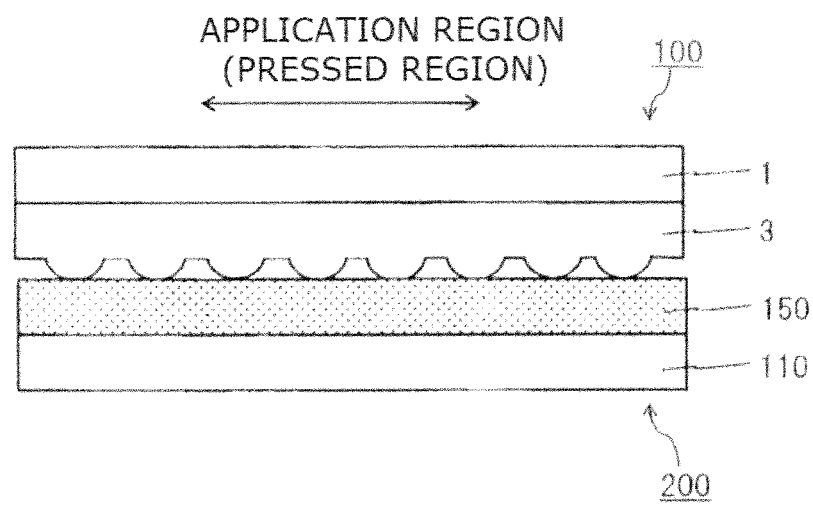
FIG. 19A is a diagram illustrating an example of a step of removing a part of the transfer layer of the intermediate transfer medium with the second peel-off sheet.
Figure 19B:
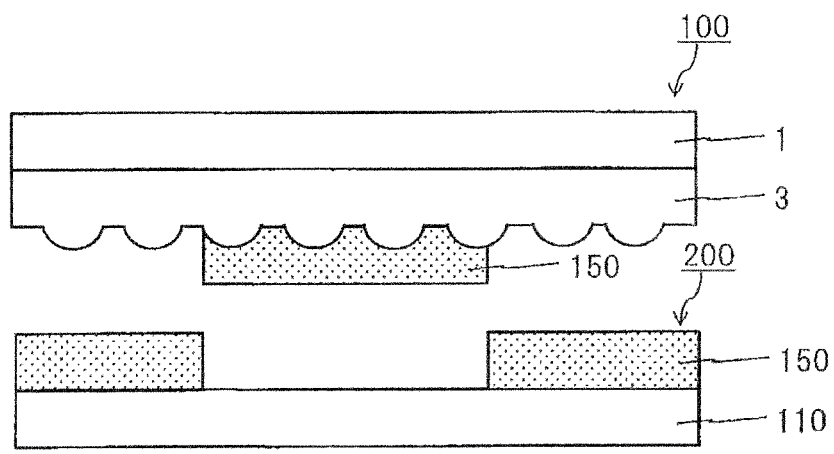
FIG. 19B is a diagram illustrating an example of a step of removing a part of the transfer layer of the intermediate transfer medium with the second peel-off sheet.

The peel-off sheet 100 can be used for removing a part of a transfer layer 150 of an intermediate transfer medium 200. FIGS. 19A and 19B are step diagrams illustrating an example of a step of removing a part of a transfer layer 150 of an intermediate transfer medium 200 with the peel-off sheet 100. When the peel-off sheet 100 and the intermediate transfer medium 200 are superimposed on each other and energy is selectively applied to the peel-off sheet 100 with heating means (see the application region (pressed region) in FIG. 19A), a part of the transfer layer 150 of the intermediate transfer medium 200 which corresponds to the region to which the energy is applied (see FIG. 19B) can be removed.

The peel-off sheet 100 includes a structural component containing particles. The particle size distribution of particles P contained in the structural component of the peel-off sheet 100 which is determined with a laser diffraction scattering particle size distribution analyzer has a maximum peak at a position of more than 0.2 μm and 5 μm or less. Hereinafter, the particles the particle size distribution of which determined with a laser diffraction scattering particle size distribution analyzer has a maximum peak at a position of more than 0.2 μm and 5 μm or less are referred to as "specific particles P". The number of types of the specific particles P that can be contained in the structural component is one or more.

The structural component may contain particles having a size of 0.2 μm or less and particles having a size of more than 5 μm as long as the above particle size distribution has a maximum peak at a position of more than 0.2 μm and 5 μm or less. The specific particles may include particles having a size of 0.2 μm or less and particles having a size of more than 5 μm.

The particle size distribution of the specific particles P which is determined with a laser diffraction scattering particle size distribution analyzer may have a plurality of peaks. In such a case, the specific particles P need to have a maximum peak at a position of more than 0.2 μm and 5 μm or less.

Figure 13:
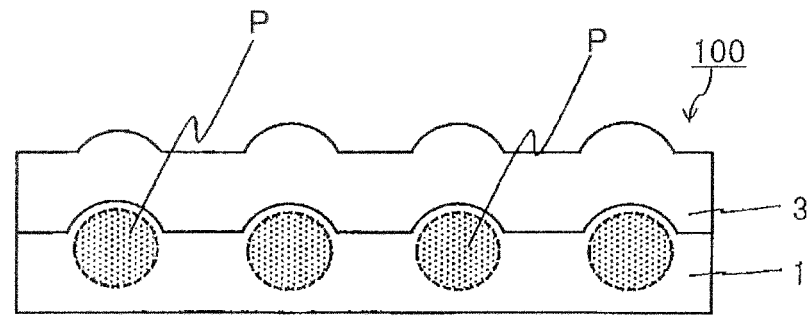
FIG. 13 is a schematic cross-sectional view of an example of the second peel-off sheet.

In the peel-off sheet 100 according to an embodiment, the structural component containing the specific particles P is the first substrate 1 as illustrated in FIG. 13. In other words, in this embodiment, the first substrate 1 contains the specific particles P.

In the peel-off sheet 100 according to an embodiment, the structural component containing the specific particles P is the peel-off layer 3 as illustrated in FIGS. 11, 12, 15A, and 15B. That is, in this embodiment, the peel-off layer 3 contains the specific particles P.

Figure 16A:
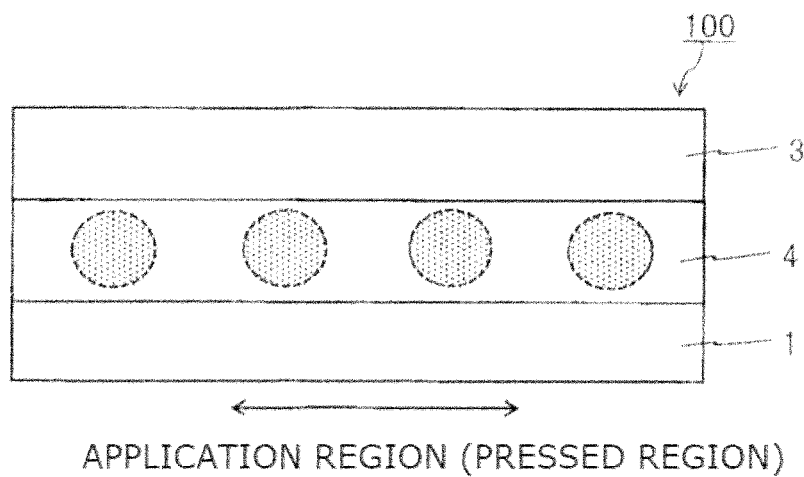
FIG. 16A is a schematic cross-sectional view of an example of the second peel-off sheet.
Figure 16B:
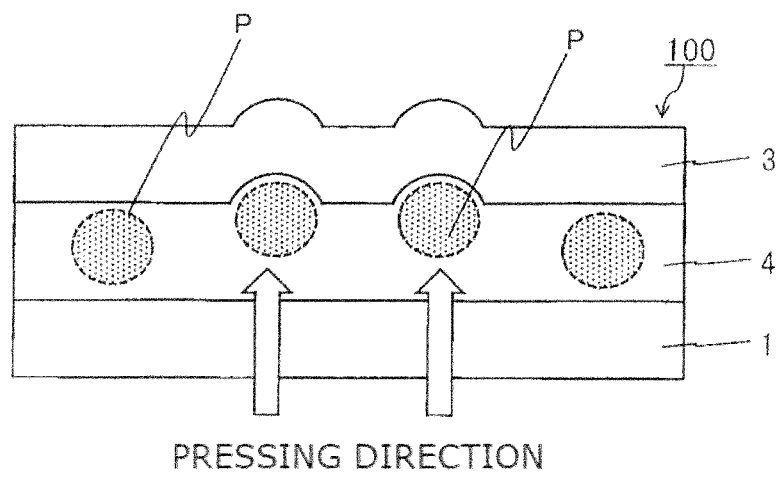
FIG. 16B is a schematic cross-sectional view of an example of the second peel-off sheet.

According to an embodiment, the peel-off sheet 100 further includes a structural component other than the first substrate 1 or the peel-off layer 3 as illustrated in FIGS. 14, 16A, and 16B. In the peel-off sheet 100 according to an embodiment, the other structural component contains the specific particles P.

Examples of the other structural component include an intermediate layer 4 interposed between the first substrate 1 and the peel-off layer 3, a back layer 5 disposed on the other surface of the first substrate 1, and a back primer layer interposed between the first substrate 1 and the back layer 5. The peel-off sheet 100 may include a structural component other than any of those described above. According to an embodiment, the intermediate layer 4 has a single-layer structure consisting of a primer layer or a laminate structure including a primer layer. According to an embodiment, the number of the structural components containing the specific particles P which are included in the peel-off sheet 100 is two or more.

In the peel-off sheet 100 according to an embodiment, an intermediate layer 4 is interposed between the first substrate 1 and the peel-off layer 3, and the intermediate layer 4 and the peel-off layer 3 contain the specific particles P.

(Specific Particles)

Examples of the shape of the specific particles P include indefinite, spherical, ovoid, cylindrical, and prism-like. The specific particles P may have a shape other than any of the above shapes.

Examples of the specific particles P include organic and inorganic particles.

Examples of the organic particles include particles of a (meth)acrylic resin, a polyurethane, a silicone resin, a nylon resin, a polystyrene, an organic fluorine compound, a benzoguanamine-formaldehyde condensate, a benzoguanamine-melamine-formaldehyde condensate, and a melamine-formaldehyde condensate.

Examples of the inorganic particles include particles of silica, alumina, clay, talc, diatomaceous earth, zeolite, calcium carbonate, barium sulfate, zinc oxide, titanium oxide, zirconium oxide, magnesium oxide, titanium oxide, aluminum hydroxide, pseudo boehmite, aluminum silicate, magnesium silicate, magnesium carbonate, and mica.

(Method for Calculating Maximum Peak of Particles)

In the present disclosure, the particle size distribution of the particles P is a particle size distribution measured with a laser diffraction scattering particle size distribution analyzer (COULTER LS 230 (Beckman Coulter, Inc.)).

In the present disclosure, the expression "the particle size distribution measured with a laser diffraction scattering particle size distribution analyzer has a maximum peak at a position of more than 0.2 μm and 5 μm or less" means that, in a particle size distribution of the particles with the vertical axis representing volume (%) and the horizontal axis representing particle size, the volume (%) on the vertical axis becomes the largest at a position at which the particle size is more than 0.2 µm and 5 µm or less.

Thus, it can be determined that the particle size distribution of the particles measured with a laser diffraction scattering particle size distribution analyzer has a maximum peak at a position of more than 0.2 µm and 5 µm or less when the volume (%) becomes the largest at a position at which the particle size is more than 0.2 µm and 5 µm or less in the particle size distribution of the particles P contained in the structural component.

The peel-off sheet 100 has a first or second form described below depending on the presence of the specific particles P contained in the structural component. The following first and second forms may be used in combination. The peel-off sheets 100 according to the first and second forms are each described below with an example.

(First Form)

In the peel-off sheet 100 according to the first form, the surface of the peel-off layer 3 has an irregular structure as a result of the specific particles P being contained in the structural component.

Figure 11:
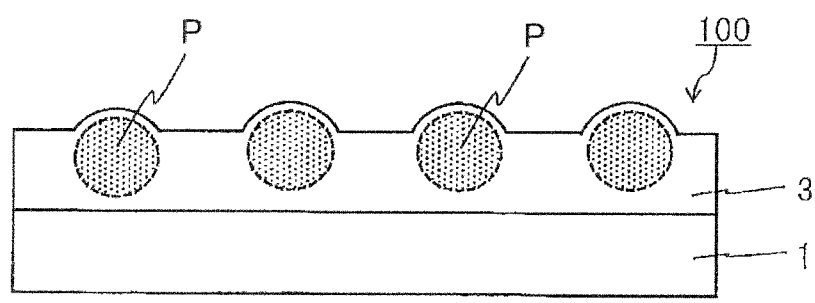
FIG. 11 is a schematic cross-sectional view of an example of a second peel-off sheet.

In the peel-off sheet 100 according to an embodiment, the peel-off layer 3 contains the specific particles P, and the specific particles P cause a part of the surface of the peel-off layer 3 to hump. In the peel-off sheet 100 according to the above form, as illustrated in FIG. 11, the surface of the peel-off layer 3 has an irregular structure constituted by humped portions and non-humped portions of the surface of the peel-off layer 3.

Figure 12:
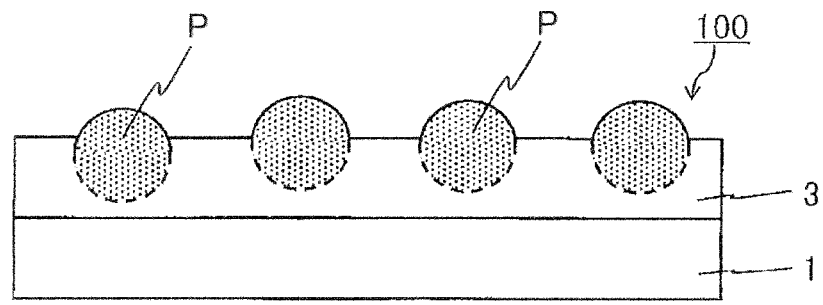
FIG. 12 is a schematic cross-sectional view of an example of the second peel-off sheet.

In the peel-off sheet 100 according to an embodiment, the peel-off layer 3 contains the specific particles P, and the specific particles P are partially protruded through the surface of the peel-off layer 3. In the peel-off sheet 100 according to the above form, as illustrated in FIG. 12, the surface of the peel-off layer 3 has an irregular structure constituted by portions through which the specific particles P are protruded and portions through which the specific particles P are not protruded.

In the peel-off sheet 100 according to an embodiment, the peel-off layer 3 contains the specific particles P. Some of the specific particles P cause a part of the surface of the peel-off layer to hump, while the other specific particles P are protruded through the surface of the peel-off layer.

In the peel-off sheet 100 according to an embodiment, a structural component other than the peel-off layer 3 contains the specific particles P, and the surface of the structural component containing the specific particles P has an irregular structure. In the peel-off sheet 100 according to the above form, as illustrated in FIGS. 13 and 14, the surface of the peel-off layer 3 has an irregular structure that follows the irregular structure of the surface of the structural component containing the specific particles P.

In the peel-off sheet 100 according to the first form, the irregular structure of the surface of the peel-off layer 3 reduces the occurrence of blocking. The term "blocking" used in the present disclosure refers to a phenomenon in which, in the case where the peel-off layer 3 and the other surface of the first substrate 1 are brought into contact with each other when, for example, the peel-off sheet 100 is wound, the peel-off layer 3 and the other surface of the first substrate 1 adhere to each other.

(Second Form)

In a peel-off sheet 100 according to the second form, the surface of the peel-off layer 3 does not have an irregular structure prior to the application of energy; the application of energy causes an irregular structure to be formed in the surface of the peel-off layer 3.

Upon the removal of the transfer layer 150 included in the intermediate transfer medium 200, heating means applies energy to the peel-off sheet 100. The heating means also applies a predetermined pressure to the peel-off sheet 100 upon the application of energy. Since the peel-off sheet 100 includes the structural component containing the specific particles P, the application of the pressure to the peel-off sheet 100 causes the specific particles P contained in the structural component to be pressed toward the peel-off layer 3. Since the application of energy has softened the peel-off layer 3, the pressed specific particles P can cause the surface of the peel-off layer 3 to hump. In another case, the pressed specific particles P can be protruded through the surface of the peel-off layer 3. As a result, an irregular structure is formed in the surface of the peel-off layer 3.

Figure 15A:
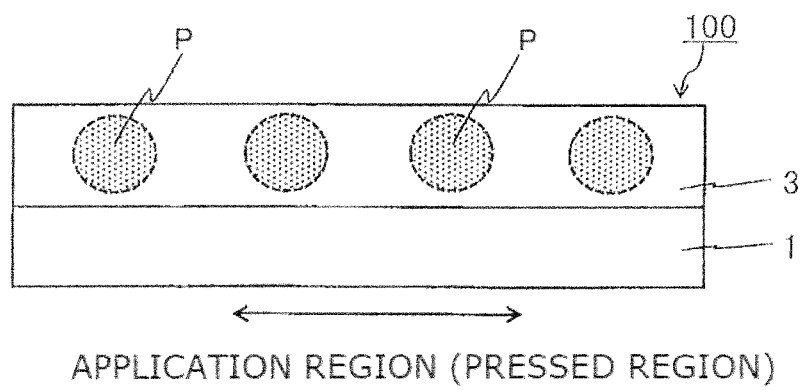
FIG. 15A is a schematic cross-sectional view of an example of the second peel-off sheet.
Figure 15B:
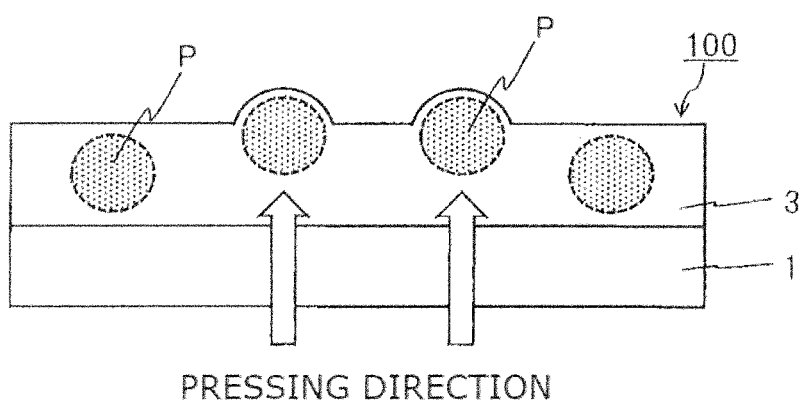
FIG. 15B is a schematic cross-sectional view of an example of the second peel-off sheet.

FIGS. 15A and 16A are schematic cross-sectional views of examples of the peel-off sheet 100 prior to the application of energy. FIG. 15B is a schematic cross-sectional view of the peel-off sheet 100 according to the form illustrated in FIG. 15A to which energy is applied. FIG. 16B is a schematic cross-sectional view of the peel-off sheet 100 according to the form illustrated in FIG. 16A to which energy is applied.

In the peel-off sheet 100 according to the form illustrated in FIG. 15A, the peel-off layer 3 contains the specific particles P. In the peel-off sheet 100 according to the form illustrated in FIG. 15A, the surface of the peel-off layer 3 does not have an irregular structure prior to the application of energy.

When energy and pressure are applied to the peel-off sheet 100 according to the form illustrated in FIG. 15A, the specific particles P contained in the portion that corresponds to the region to which the energy is applied (the application region (pressed region) in the drawings) are pressed toward the surface of the peel-off layer 3 as illustrated in FIG. 15B. Since the application of energy has softened the peel-off layer 3, the pressed specific particles P can cause the surface of the peel-off layer 3 to hump. As a result, an irregular structure constituted by humped portions and non-humped portions is formed in the surface of the peel-off layer 3.

In the peel-off sheet 100 according to the form illustrated in FIG. 16A, the intermediate layer 4 contains the specific particles P. In the peel-off sheet 100 according to the form illustrated in FIG. 16A, the surface of the intermediate layer 4 does not have an irregular structure prior to the application of energy.

When energy and pressure are applied to the peel-off sheet 100 according to the form illustrated in FIG. 16A, the specific particles P contained in the portion that corresponds to the region to which the energy is applied (the application region (pressed region) in the drawings) are pressed toward the surface of the peel-off layer 3 as illustrated in FIG. 16B. Since the application of energy has softened the intermediate layer 4 and the peel-off layer 3, the pressed specific particles P can cause the surfaces of the intermediate layer 4 and the peel-off layer 3 to hump. As a result, an irregular structure constituted by humped portions and non-humped portions is formed in the surface of the peel-off layer 3.

Although, in the peel-off sheets 100 according to the forms illustrated in FIGS. 15B and 16B, a part of the surface of the peel-off layer 3 is humped as a result of the specific particles P being pressed, one or a plurality of the specific particles P pressed may be protruded through the surface of the peel-off layer 3.

The irregular structure of the surface of the peel-off layer 3 or the irregular structure that is to be formed in the surface of the peel-off layer 3 enhances the peel-off property of the peel-off sheet 100 with which a part of the transfer layer 150 of the intermediate transfer medium 200 is removed. In particular, the peel-off sheet 100 has a suitable peel-off property even in the case where the amount of energy applied for removing a part of the transfer layer 150 of the intermediate transfer medium 200 is reduced. Reducing the amount of energy applied for removing a part of the transfer layer 150 of the intermediate transfer medium 200 suppresses, for example, the formation of wrinkles in the transfer layer 150 of the intermediate transfer medium 200 and a rupture of the intermediate transfer medium 200.

The mechanisms by which the irregular structure of the surface of the peel-off layer 3 or the irregular structure that is to be formed in the surface of the peel-off layer 3 enhances the peel-off property with which the transfer layer 150 of the intermediate transfer medium 200 is removed are not exactly clear; it is considered that the peel-off property can be enhanced for the following reasons.

A comparison between the area of the surface of the peel-off layer 3 having an irregular structure and the area of the surface of a peel-off layer that does not have an irregular structure per unit region shows that the peel-off layer 3 having an irregular structure has a larger surface area.

Upon the removal of the transfer layer 150 of the intermediate transfer medium 200, energy is applied from heating means to the peel-off sheet 100. The application of energy softens the transfer layer 150 of the intermediate transfer medium 200 as well as the peel-off layer 3 of the peel-off sheet 100.

The softened transfer layer 150 of the intermediate transfer medium 200 becomes deformed so as to follow the shape of the surface of the peel-off layer 3 and, consequently, the surface of the peel-off layer 3 and the transfer layer 150 of the intermediate transfer medium 200 are brought into intimate contact with each other. As described above, the peel-off layer 3 having an irregular structure has a larger surface area per unit region than a peel-off layer that does not have an irregular structure. Thus, in the peel-off sheet 100, the area of the surface of the peel-off layer 3 which comes into contact with the transfer layer 150 of the intermediate transfer medium 200 can be increased. It is considered that the increase in the area of contact contributes to the improvement of peel-off property.

Limiting the particle size corresponding to the maximum peak portion to be larger than 0.2 μm enables the irregular structure of the surface of the peel-off layer 3 or the irregular structure that is to be formed in the surface of the peel-off layer 3 to produce the above advantageous effects. Limiting the particle size corresponding to the maximum peak portion to be 5 μm or less reduces the likelihood of the specific particles P falling out of the peel-off sheet 100.

In the present disclosure, the peel-off property is an index of removal performance when the transfer layer 150 of the intermediate transfer medium 200 is removed with the peel-off layer 3. The expression "suitable peel-off property" means that the transfer layer 150 of the intermediate transfer medium 200 can be removed with certainty.

The structural components of the second peel-off sheet 100 are described with examples below.
(First Substrate)

The second peel-off sheet 100 includes a first substrate 1. The first substrate 1 supports a peel-off layer 3. According to an embodiment, the first substrate 1 includes a resin film. According to an embodiment, the first substrate 1 has a single-layer structure consisting of one resin film or a laminate structure including two or more resin films stacked on top of one another. The resin film may be either a stretched or unstretched film.

Examples of the resin material constituting the resin film include the resin materials described above as examples or preferable examples in the description of the first substrate included in the first peel-off sheet. The number of types of the resin materials that can be contained in the resin film is one or more.

In the peel-off sheet 100 according to an embodiment, the first substrate 1 contains the specific particles P. In the peel-off sheet 100 according to an embodiment, the surface of the peel-off layer has an irregular structure as a result of the specific particles P being contained in the first substrate 1. According to an embodiment, the first substrate 1 is a resin film filled with the specific particles P. According to an embodiment, the first substrate 1 contains the specific particles P, and at least one of the surfaces of the first substrate 1, that is, one surface, or the peel-off layer 3-side surface and the other surface, or a surface opposite to the peel-off layer 3-side surface, has an irregular structure. In the first substrate 1 according to an embodiment, the surface of the first substrate 1 is humped as a result of the specific particles P being contained in the first substrate 1 or the specific particles P are partially protruded through the surface of the first substrate 1.

In the peel-off sheet 100 according to an embodiment, the other surface of the first substrate 1 has an irregular structure formed by the specific particles P. The peel-off sheet 100 according to the above form has suitable blocking resistance.

The thickness of the first substrate 1 is preferably 2 μm or more and 25 μm or less and is more preferably 3 μm or more and 10 μm or less.

The thickness of the first substrate 1 that contains the specific particles P is preferably one time or more and three times or less the particle size corresponding to the maximum peak portion of the specific particles P.

One or both of the surfaces of the first substrate 1 may be subjected to a surface treatment. Examples of the surface treatment include a corona discharge treatment, a flame treatment, an ozone treatment, an ultraviolet treatment, a radiation treatment, a roughening treatment, a chemical treatment, a plasma treatment, a cold plasma treatment, a grafting treatment, and a primer treatment.
(Peel-Off Layer)

The second peel-off sheet 100 includes a peel-off layer 3. The peel-off layer 3 contains a resin component. Examples of the resin component of the peel-off layer 3 include a (meth)acrylic resin, a vinyl chloride-vinyl acetate copolymer, a polyester, vinyl chloride, a polyamide, a styrene-acryl copolymer, a styrene-vinyl chloride-vinyl acetate copolymer, polyvinyl butyral, an epoxy resin, and a polyamide. The peel-off layer 3 may contain one type of a resin component and may contain two or more types of resin components.

The total mass of the resin components is preferably 70% by mass or more and is more preferably 80% by mass or more of the total mass of the peel-off layer 3. The upper limit for the above proportion is not set and may be 100% by mass in the case where the peel-off layer 3 does not contain the specific particles P.

According to an embodiment, the peel-off layer 3 contains the specific particles P as illustrated in FIGS. 11, 12, 15A, and 15B. The surface of the peel-off layer 3 according to a preferable form has an irregular structure as illustrated in FIGS. 11 to 14. The peel-off layer 3 according to the preferable form has suitable blocking resistance.

In the case where the peel-off layer 3 contains the specific particles P, the total mass of the specific particles P is preferably 5% by mass or more and 25% by mass or less and is more preferably 15% by mass or more and 20% by mass or less of the total mass of the peel-off layer 3. The peel-off layer 3 according to the above form has a further suitable peel-off property when the amount of energy applied for removing a part of the transfer layer 150 of the intermediate transfer medium 200 is reduced.

The peel-off layer 3 according to a preferable form contains at least one selected from the group consisting of a (meth)acrylic resin, a vinyl chloride-vinyl acetate copolymer, and a polyester. The peel-off layer 3 according to the above form has a suitable peel-off property.

The total mass of the resin component selected from the above group is preferably 70% by mass or more and is more preferably 80% by mass or more of the total mass of the peel-off layer 3. The peel-off layer 3 according to the above form has a further suitable peel-off property.

The weight-average molecular weight (Mw) of the (meth) acrylic resin is preferably 20,000 or more and 50,000 or less. A peel-off layer 3 that contains a (meth)acrylic resin having the above Mw has a further suitable peel-off property.

In the present disclosure, the term "Mw" refers to the value measured by gel permeation chromatography using polystyrene as a standard substance. Mw is measured by a method in accordance with JIS K 7252-3 (published in 2016).

The glass-transition temperature (Tg) of the (meth)acrylic resin is preferably 80° C. or more and 120° C. or less. A peel-off layer 3 that contains a (meth)acrylic resin having the above Tg has a further suitable peel-off property.

In the present disclosure, Tg is measured by differential scanning calorimetry (DSC) at a heating rate of 10° C./min in accordance with JIS K 7121.

In the present disclosure, the term "vinyl chloride-vinyl acetate copolymer" refers to a copolymer of vinyl chloride and vinyl acetate. The vinyl chloride-vinyl acetate copolymer may include a constitutional unit derived from another copolymerization component.

The number-average molecular weight (Mn) of the vinyl chloride-vinyl acetate copolymer is preferably 5,000 or more and 50,000 or less and is more preferably 7,000 or more and 43,000 or less. A peel-off layer 3 that contains a vinyl chloride-vinyl acetate copolymer having the above Mn has a further suitable peel-off property.

In the present disclosure, the term "Mn" refers to the value measured by gel permeation chromatography using polystyrene as a standard substance. Mn is measured by a method in accordance with JIS K 7252-3 (published in 2016).

The Tg of the vinyl chloride-vinyl acetate copolymer is preferably 50° C. or more and 90° C. or less and is more preferably 60° C. or more and 80° C. or less. A peel-off layer 3 that contains a vinyl chloride-vinyl acetate copolymer having the above Tg has a further suitable peel-off property.

The polyester is preferably, for example, a copolymer of a dicarboxylic acid compound and a diol compound. Specific examples of the dicarboxylic acid compound and the diol compound and the proportion of the constitutional unit derived from a polymerization component other than the dicarboxylic acid compound or the diol compound are the same as those described in the respective parts of the description of the first peel-off sheet above.

The peel-off layer 3 according to a more preferable form contains a vinyl chloride-vinyl acetate copolymer and a crystalline polyester. A peel-off layer 3 that contains a vinyl chloride-vinyl acetate copolymer and a crystalline polyester has a suitable peel-off property. The definition of the crystalline polyester is the same as that described in the corresponding part of the description of the first peel-off sheet above.

The Mn of the crystalline polyester is preferably 10,000 or more and 50,000 or less and is more preferably 20,000 or more and 40,000 or less. A peel-off layer 3 that contains a crystalline polyester having the above Mn has a further suitable peel-off property.

The Tg of the crystalline polyester is preferably −50° C. or more and 50° C. or less. A peel-off layer 3 that contains a crystalline polyester having the above Tg has a further suitable peel-off property. In the case where the peel-off layer 3 does not contain the specific particles P, the Tg of the crystalline polyester is more preferably −15° C. or more and 20° C. or less. In the case where the peel-off layer 3 contains the specific particles P, the Tg of the crystalline polyester is more preferably −25° C. or more and 15° C. or less.

The melting point of the crystalline polyester is preferably 50° C. or more and 150° C. or less and is more preferably 80° C. or more and 120° C. or less. A peel-off layer 3 that contains a crystalline polyester having the above melting point has a further suitable peel-off property.

In the present disclosure, melting point is measured by DSC at a heating rate of 20° C./min in accordance with JIS K 7121 (published in 2012).

The total mass of the vinyl chloride-vinyl acetate copolymer and the crystalline polyester is preferably 70% by mass or more and is more preferably 80% by mass or more of the total mass of the peel-off layer 3.

The mass of the vinyl chloride-vinyl acetate copolymer is preferably 5% by mass or more and 50% by mass or less and is more preferably 10% by mass or more and 40% by mass or less of the total mass of the vinyl chloride-vinyl acetate copolymer and the crystalline polyester.

The thickness of the peel-off layer 3 is preferably 0.2 μm or more and 3 μm or less. In the case where the peel-off layer 3 contains the specific particles P, the thickness of the peel-off layer 3 is preferably 0.1 times or more and 1.5 times or less the size of the specific particles P which corresponds to the maximum peak portion.

The peel-off layer 3 can be formed by, for example, dissolving or dispersing the components of the peel-off layer 3 in an appropriate solvent to prepare a peel-off layer-forming coating liquid, performing the application of the peel-off layer-forming coating liquid, and subsequently performing drying. The method for the application of the coating liquid can be selected from, for example, various application methods known in the related art. Examples of the application method include gravure printing, screen printing, and reverse coating with a gravure plate. Application methods other than the above methods can also be used.

In the case where, as illustrated in FIG. 13, a structural component other than the peel-off layer 3 contains the specific particles P and the surface of the structural component has an irregular structure, an irregular structure that follows the irregular structure of the structural component can be formed in the surface of the peel-off layer 3 when the peel-off layer 3 is formed by applying the peel-off layer-forming coating liquid and drying the resulting film.

(Intermediate Layer)

According to an embodiment, the second peel-off sheet 100 includes an intermediate layer 4 interposed between the first substrate 1 and the peel-off layer 3. The intermediate layer 4 may have either a single-layer structure or a laminate structure.

According to an embodiment, the intermediate layer 4 contains the specific particles P. In the peel-off sheet 100 according to an embodiment, one or both of the intermediate layer 4 and the peel-off layer 3 contains the specific particles P.

According to an embodiment, the intermediate layer 4 includes a primer layer. According to an embodiment, the primer layer contains the specific particles P. Examples of the components of the primer layer include a polyester, a vinyl resin, a polyurethane, a (meth)acrylic resin, a polyamide, a polyether, a polystyrene, and a cellulose resin. The number of types of the components that can be contained in the primer layer is one or more.

The thickness of the primer layer is 0.05 µm or more and 2 µm or less.

In the case where the intermediate layer 4 contains the specific particles P, the total mass of the specific particles P is preferably 3% by mass or more and 50% by mass or less and is more preferably 5% by mass or more and 30% by mass or less of the total mass of the intermediate layer 4. The intermediate layer 4 according to the above form can further enhance the peel-off property.

In the case where the intermediate layer 4 contains the specific particles P, the thickness of the intermediate layer 4 is preferably 0.1 times or more and 2 times or less the size of the specific particles P which corresponds to the maximum peak portion.

In the case where one or both of the intermediate layer 4 and the peel-off layer 3 contain the specific particles P, the total thickness of the intermediate layer 4 and the peel-off layer 3 is preferably 0.1 times or more and 3 times or less the size of the specific particles P which corresponds to the maximum peak portion.

(Back Layer)

According to an embodiment, the peel-off sheet 100 includes a back layer 5 disposed on the other surface of the first substrate 1. Examples of the component of the back layer 5 include ethylcellulose, hydroxycellulose, hydroxypropylcellulose, methylcellulose, cellulose acetate, cellulose acetate butyrate, nitrocellulose, polyvinyl alcohol, polyvinyl acetate, polyvinyl butyral, polyvinyl acetal, polyvinylpyrrolidone, polymethyl methacrylate, polyethyl acrylate, polyacrylamide, an acrylonitrile-styrene copolymer, a polyamide, a polyester, a polyurethane, a silicone-modified resin, and a fluorine-modified polyurethane. The number of types of the components that can be contained in the back layer is one or more.

According to an embodiment, the back layer 5 contains the specific particles P. According to an embodiment, in the peel-off sheet 100, the surface of the peel-off layer has an irregular structure as a result of the specific particles P being contained in the back layer 5. According to an embodiment, either or both of the first substrate 1-side surface of the back layer 5 and the other surface of the back layer 5 which is opposite to the first substrate 1-side surface have an irregular structure.

The thickness of the back layer 5 is preferably 0.3 µm or more and 3 µm or less.

(Back Primer Layer)

According to an embodiment, the peel-off sheet 100 includes a back primer layer interposed between the first substrate 1 and the back layer 5.

According to an embodiment, the back primer layer contains the specific particles P. According to an embodiment, in the peel-off sheet 100, the surface of the peel-off layer has an irregular structure as a result of the specific particles P being contained in the back primer layer.

(Functional Layer)

According to an embodiment, the second peel-off sheet 100 includes one or a plurality of functional layers arranged on one of the surfaces of the first substrate 1 to be frame sequentially with the peel-off layer 3 (not illustrated in the drawings).

Examples of the functional layer include a transfer layer, a dye layer, and a melt layer. According to an embodiment, the transfer layer has a single-layer structure consisting of a protective layer or a laminate structure including a protective layer. Examples of the dye layer include a dye layer of yellow (Y), magenta (M), or cyan (C).

Although an example where the second peel-off sheet 100 is used for removing a part of the transfer layer 150 of the intermediate transfer medium 200 is primarily described above, the second peel-off sheet 100 may also be used for removing a part of the transfer layer included in a protective layer transfer sheet.

<Peel-Off Region>

Figure 18:
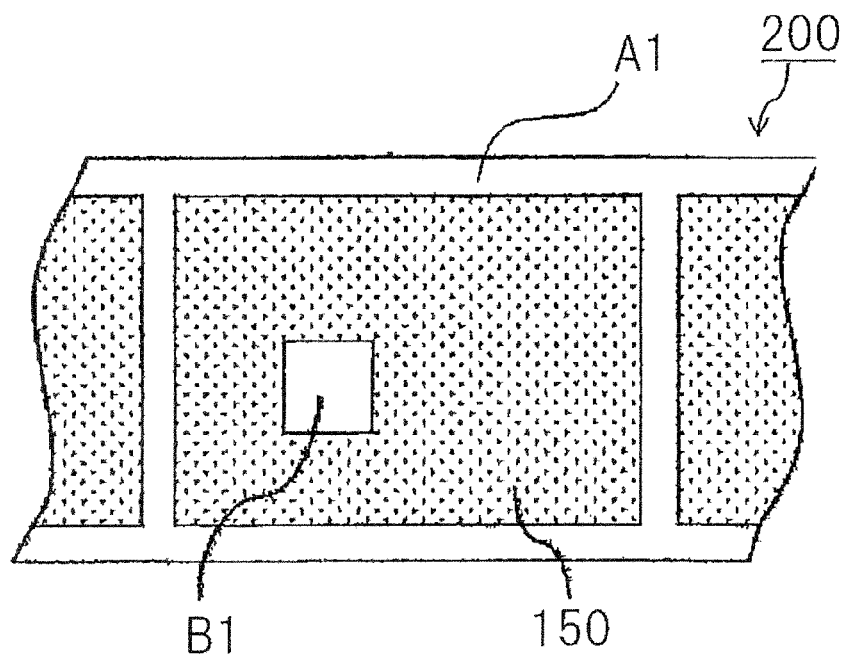
FIG. 18 is a plan view of an example of a removal region of a transfer layer included in an intermediate transfer medium.

FIG. 18 is a plan view of an example of the removal region of the transfer layer 150 of the intermediate transfer medium 200 which is to be removed with the second peel-off sheet 100. The hollow regions in FIG. 18 (Reference numerals A1 and B1 in FIG. 18) denote the region that is to be removed with the peel-off layer 3 of the second peel-off sheet 100. Examples of the region denoted by Reference numeral B1 include an IC chip portion, a magnetic stripe portion, a transmitting and receiving antenna portion, and a signature portion.

According to an embodiment, the second peel-off sheet satisfies one or more of the conditions (i) to (v) below. In the case where the second peel-off sheet satisfies two or more of the conditions (i) to (v) below, any of the conditions (i) to (v) may be combined with one another.

(i) the structural component containing particles is the peel-off layer
(ii) the peel-off layer contains the vinyl chloride-vinyl acetate copolymer and the crystalline polyester
(iii) the intermediate layer is interposed between the first substrate and the peel-off layer
(iv) the structural component containing particles is the intermediate layer
(v) the intermediate layer is the primer layer

[Combination of Peel-Off Sheet and Intermediate Transfer Medium]

<Intermediate Transfer Medium>

The intermediate transfer medium used in combination with the first or second peel-off sheet according to the present disclosure may be appropriately selected from intermediate transfer media known in the related art.

According to an embodiment, the intermediate transfer medium includes a second substrate and a transfer layer. The transfer layer has a single-layer structure consisting of a receiving layer or a laminate structure including the receiving layer. The receiving layer is disposed in the uppermost surface of the intermediate transfer medium.

The combination of the peel-off sheet and the intermediate transfer medium is described with reference to the attached drawings below, taking a case where the first peel-off sheet 10 is used as a peel-off sheet as an example. Note that the second peel-off sheet 100 may also be used instead of the first peel-off sheet 10.

Figure 5:
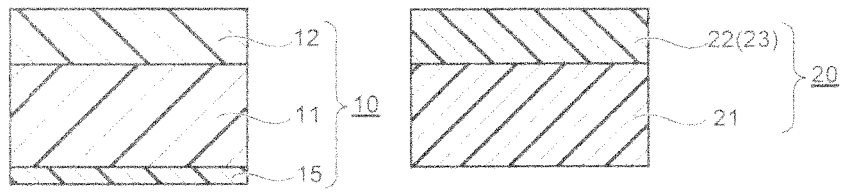
FIG. 5 is a schematic cross-sectional view of a combination of a first peel-off sheet and an intermediate transfer medium according to an embodiment.

The combination of the peel-off sheet 10 and the intermediate transfer medium 20 according to the present disclosure is characterized in that it includes the peel-off sheet 10 and the intermediate transfer medium 20 as illustrated in FIG. 5. The intermediate transfer medium 20 includes a second substrate 21 and a transfer layer 23 that includes at least a receiving layer 22.

Figure 6:
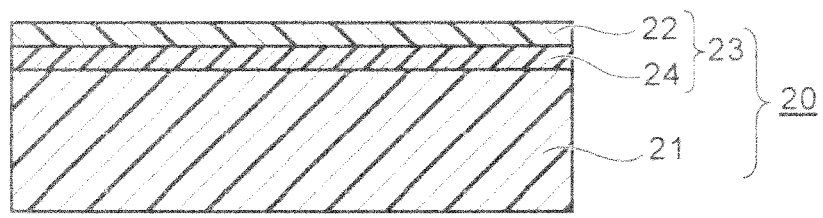
FIG. 6 is a schematic cross-sectional view of an intermediate transfer medium according to an embodiment which constitutes the combination according to the present disclosure.

According to an embodiment, the transfer layer 23 included in the intermediate transfer medium 20 includes a peeling layer 24 interposed between the second substrate 21 and the receiving layer 22 as illustrated in FIG. 6.

Figure 7:
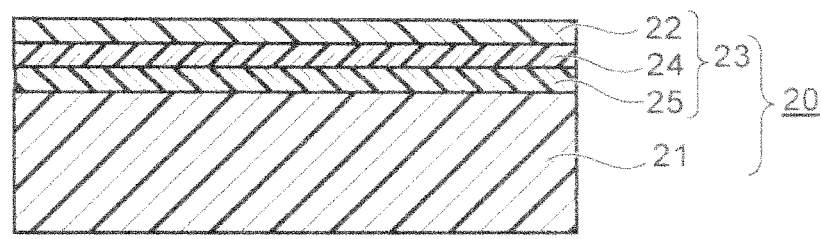
FIG. 7 is a schematic cross-sectional view of an intermediate transfer medium according to an embodiment which constitutes the combination according to the present disclosure.

According to an embodiment, the intermediate transfer medium 20 includes a release layer 25 interposed between the second substrate 21 and the receiving layer 22 as illustrated in FIG. 7. In the case where the intermediate transfer medium 20 includes the peeling layer 24 and the release layer 25, the release layer 25 and the peeling layer 24 are arranged between the second substrate 21 and the receiving layer 22 in this order (see FIG. 7).

Figure 8:
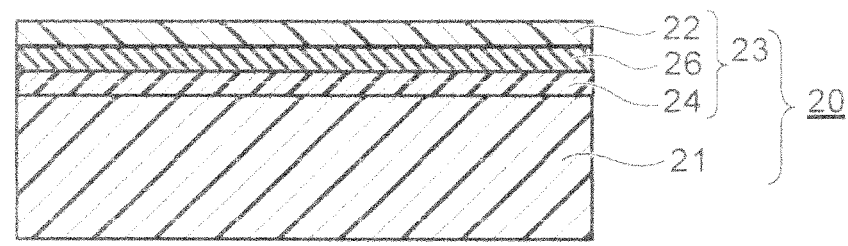
FIG. 8 is a schematic cross-sectional view of an intermediate transfer medium according to an embodiment which constitutes the combination according to the present disclosure.

According to an embodiment, the transfer layer 22 included in the intermediate transfer medium 20 includes a protective layer 26 disposed below the receiving layer 22 as illustrated in FIG. 8. In the case where the transfer layer 23 of the intermediate transfer medium 20 includes the peeling layer 24 and the protective layer 26, the protective layer 26 and the peeling layer 24 are arranged below the receiving layer 22 in this order (see FIG. 8).

The layers included in the intermediate transfer medium are each described below. Since the peel-off sheet has been described above, the description thereof is omitted. Since the release layer that can be included in the intermediate transfer medium is the same as the release layer that can be included in the peel-off sheet, the description thereof is omitted.

(Second Substrate)

The material constituting the second substrate can be appropriately selected from the materials that can be used for producing the first substrate included in the first or second peel-off sheet.

(Receiving Layer)

According to an embodiment, the receiving layer contains a resin material. Examples of the resin material include a polyolefin, vinyl resins, such as polyvinyl chloride and a vinyl chloride-vinyl acetate copolymer, a (meth)acrylic resin, a cellulose resin, a polyester, a polyamide, a polycarbonate, a styrene resin, an epoxy resin, a polyurethane, and an ionomer resin.

The polyester may be either a crystalline polyester or an amorphous polyester. In the present disclosure, the term "amorphous polyester" refers to a polyester that does not show a distinctive melting peak in any of the two heating steps described above with a differential scanning calorimeter.

Among these, a vinyl resin and a polyester are preferable and a vinyl chloride-vinyl acetate copolymer and a crystalline polyester are particularly preferable in consideration of the peel-off property and the density of the image that is to be formed.

The receiving layer according to a preferable form contains either or both of a vinyl resin and a polyester. The receiving layer according to a more preferable form contains a vinyl chloride-vinyl acetate copolymer and a polyester. The receiving layer according to a further preferable form contains a vinyl chloride-vinyl acetate copolymer and a crystalline polyester.

The number of types of the resin materials that can be contained in the receiving layer is one or more.

The content of the resin material in the receiving layer is preferably 50% by mass or more and is more preferably 80% by mass or more. In such a case, the peel-off property can be further enhanced, and the image density can be further increased.

According to an embodiment, the receiving layer contains the release agent. This enhances releasability from the coloring layer, etc. included in the peel-off sheet.

The receiving layer may contain the above-described additive.

The thickness of the receiving layer is preferably 0.5 µm or more and 20 µm or less and is more preferably 1 µm or more and 10 µm or less. In such a case, the image density can be further increased.

The receiving layer can be formed by, for example, dispersing or dissolving the above materials in water or an appropriate organic solvent to prepare a coating liquid, applying the coating liquid to the second substrate or the like by the known means described above to form a coating film, and drying the coating film.

(Protective Layer)

According to an embodiment, the transfer layer included in the intermediate transfer medium includes a protective layer disposed below the receiving layer.

According to an embodiment, the protective layer contains a resin material. Examples of the resin material include a polyester, a (meth)acrylic resin, an epoxy resin, a styrene resin, a (meth)acrylic polyol resin, a polyurethane, an ionizing radiation-curable resin, and an ultraviolet-absorbing resin. The number of types of the resin materials that can be contained in the protective layer is one or more.

According to an embodiment, the protective layer contains an isocyanate compound. Examples of the isocyanate compound include xylene diisocyanate, toluene diisocyanate, isophorone diisocyanate, and hexamethylene diisocyanate. The number of types of the isocyanate compounds that can be contained in the protective layer is one or more.

The protective layer may contain the above-described additive.

The thickness of the protective layer is preferably 0.5 µm or more and 7 µm or less and is more preferably 1 µm or more and 5 µm or less.

In such a case, the durability of the protective layer can be further enhanced.

The protective layer can be formed by, for example, dispersing or dissolving the above materials in water or an appropriate organic solvent to prepare a coating liquid, applying the coating liquid to the second substrate or the like by the known means described above to form a coating film, and drying the coating film.

(Peeling Layer)

The peeling layer that can be included in the intermediate transfer medium is the same as, for example, the peeling layer included in the peel-off sheet.

Alternatively, a peeling layer according to the embodiment described below may be used instead.

According to an embodiment, the peeling layer contains a resin material. Examples of the resin material include a polyester, a (meth)acrylic resin, an epoxy resin, a styrene resin, an acrylic polyol resin, a polyurethane, an ionizing radiation-curable resin, and an ultraviolet-absorbing resin. The number of types of the resin materials that can be contained in the peeling layer is one or more.

According to an embodiment, the peeling layer contains an isocyanate compound. Examples of the isocyanate compound include xylene diisocyanate, toluene diisocyanate, isophorone diisocyanate, and hexamethylene diisocyanate. The number of types of the isocyanate compounds that can be contained in the peeling layer is one or more.

The thickness of the peeling layer is preferably 0.5 µm or more and 7 µm or less and is more preferably 1 µm or more and 5 µm or less.

[Method for Producing Printed Material]

A method for producing a printed material according to the present disclosure includes the steps of:
- providing a combination of the first or second peel-off sheet and an intermediate transfer medium;
- performing thermocompression bonding between the receiving layer and the peel-off layer in at least a part of a removal region of the intermediate transfer medium and subsequently peeling off the transfer layer disposed in the removal region from the intermediate transfer medium;
- transferring the transfer layer disposed in a non-removal region of the intermediate transfer medium to a transfer-receiving article; and
- forming an image on the receiving layer prior to or subsequent to the step of peeling off the transfer layer and prior to the step of transferring the transfer layer.

Each of the steps included in the method for producing a printed material according to the present disclosure is described below.

(Step of Providing Peel-Off Sheet and Intermediate Transfer Medium)

The method for producing a printed material according to the present disclosure includes a step of providing the first or second peel-off sheet and an intermediate transfer medium. Since the methods for producing the first peel-off sheet, the second peel-off sheet, and the intermediate transfer medium are the same as those described above, the description of these methods is omitted.

Figure 9:
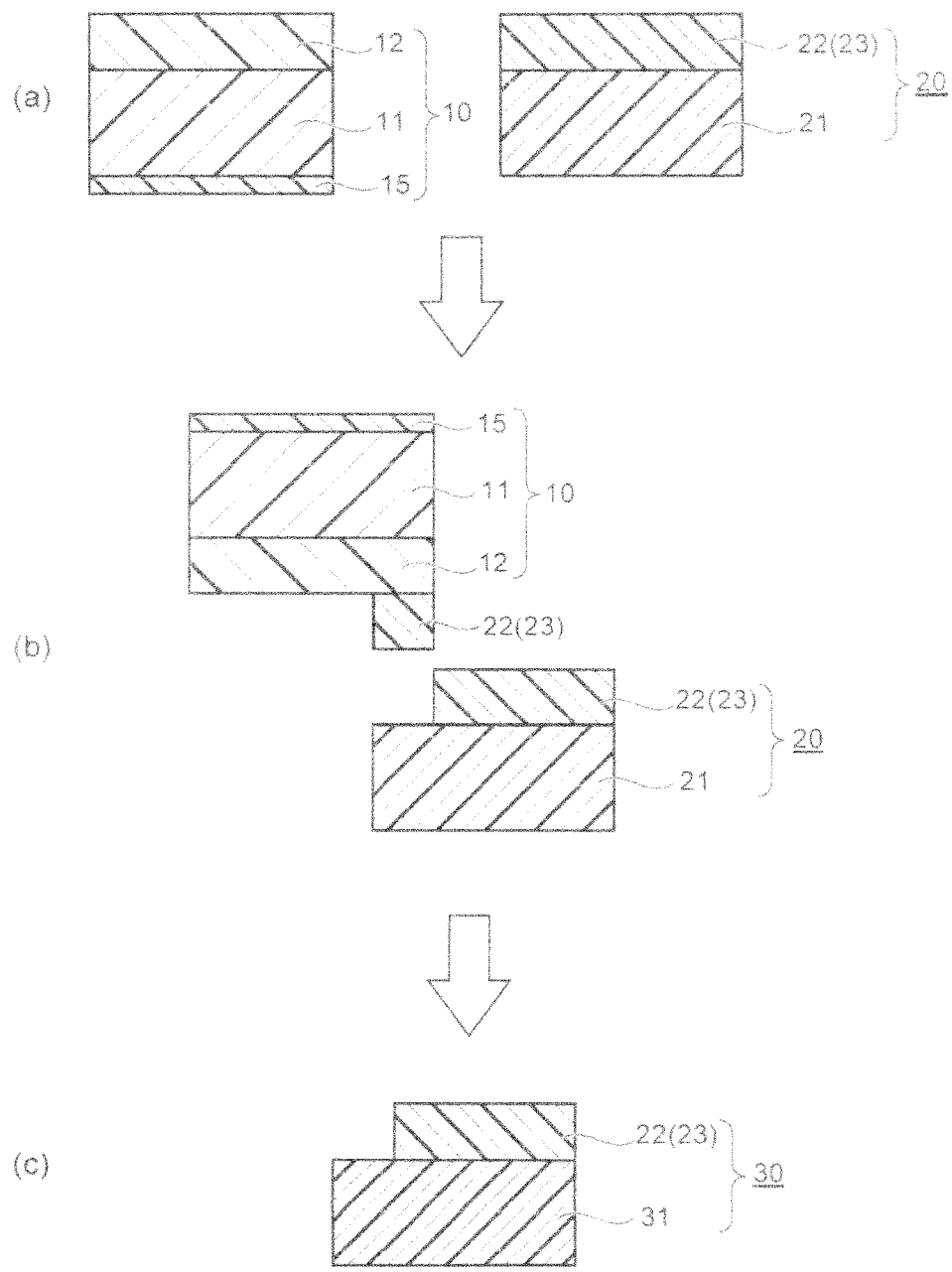
FIG. 9 includes schematic diagrams for explaining a method for producing a printed material in which a combination of a first peel-off sheet and an intermediate transfer medium is used.

For example, a combination of a first peel-off sheet 10 and an intermediate transfer medium 20 is provided as illustrated in FIG. 9(a). For example, a combination of a second peel-off sheet 100 and an intermediate transfer medium 200 is provided as illustrated in FIG. 19A.

(Peel-Off Step)

The method for producing a printed material according to the present disclosure includes a step of peeling off the transfer layer disposed in a removal region of the intermediate transfer medium.

According to an embodiment, the transfer layer disposed in the removal region of the intermediate transfer medium can be peeled off by, in at least a part of the removal region, superimposing the receiving layer included in the intermediate transfer medium and the peel-off layer included in the peel-off sheet on each other, then performing pressure-bonding while heating the peel-off sheet from the back layer-side with a thermal head or the like, and subsequently removing the peel-off sheet.

In this step, it is preferable to perform the thermocompression bonding between the transfer layer and the peel-off layer all over the entire removal region. In such a case, the transfer layer disposed in the removal region can be peeled off with further certainty.

For example, in at least a part of the removal region of the intermediate transfer medium 20, the receiving layer 22 and the peel-off layer 12 are thermocompression-bonded to each other and, subsequently, the transfer layer 23 disposed in the removal region is peeled off from the intermediate transfer medium 20 as illustrated in FIG. 9(b). For example, as illustrated in FIGS. 19A and 19B, the second peel-off sheet 100 and the intermediate transfer medium 200 are combined with each other, and a part of the transfer layer 150 of the intermediate transfer medium 200 is removed with the peel-off layer 3 of the second peel-off sheet 100.

(Step of Transferring to Transfer-Receiving Article)

The method for producing a printed material according to the present disclosure includes a step of transferring the transfer layer disposed in a non-removal region of the intermediate transfer medium to a transfer-receiving article. For example, subsequent to the peel-off step, the transfer-receiving article and the intermediate transfer medium from which a part of the transfer layer has been removed are combined with each other and, subsequently, the transfer layer of the intermediate transfer medium is transferred to the transfer-receiving article.

The above transfer can be performed by a method known in the related art with a commercial thermal transfer printer. Examples of the method for transferring the transfer layer include a heat roller method, a hot stamping method, and a thermal head method.

The transfer-receiving article can be selected appropriately in accordance with the intended application. For example, paper substrates, such as a wood free paper sheet, an art paper sheet, a coated paper sheet, a resin coated paper sheet, a cast coated paper sheet, a paper board, a synthetic paper sheet, and an impregnated paper sheet, and the resin films described above can be used.

For example, as illustrated in FIG. 9(c), the transfer layer 23 disposed in the non-removal region of the intermediate transfer medium 20 is transferred to a transfer-receiving article 31. Hereby, a printed material 30 is formed. For example, the transfer layer 150 disposed in the non-removal region of the intermediate transfer medium 200 is transferred to a transfer-receiving article (not illustrated in the drawings).

(Image Formation Step)

The method for producing a printed material according to the present disclosure includes a step of forming an image on the receiving layer included in the intermediate transfer medium. For forming the image, the coloring layer included in the first peel-off sheet may be used. Alternatively, the dye layer included in the second peel-off sheet may also be used. In another case, a thermal transfer sheet or the like that includes a coloring layer may also be used.

The image may be formed either before or after the transfer layer has been peeled off.

The present disclosure relates to, for example, [1] to [21] below.

[1] A peel-off sheet including a first substrate and a peel-off layer, the peel-off layer containing a vinyl chloride-vinyl acetate copolymer and a crystalline polyester.

[2] The peel-off sheet described in [1], wherein the crystalline polyester has a glass-transition temperature of −50° C. or more and 50° C. or less.

[3] The peel-off sheet described in [1] or [2], wherein the crystalline polyester has a melting point of 50° C. or more and 150° C. or less.

[4] The peel-off sheet described in any one of [1] to [3], wherein the crystalline polyester has a number-average molecular weight of 10,000 or more and 50,000 or less.

[5] The peel-off sheet described in any one of [1] to [4], wherein a content of the crystalline polyester in the peel-off layer is 20 parts by mass or more and 95 parts by mass or less relative to 100 parts by mass of a total content of the vinyl chloride-vinyl acetate copolymer and the crystalline polyester in the peel-off layer.

[6] The peel-off sheet described in any one of [1] to [5], wherein the peel-off layer contains particles.

[7] The peel-off sheet described in [6], wherein a content of the particles in the peel-off layer is 0.1 parts by mass or more and 30 parts by mass or less relative to 100 parts by mass of a total content of resin materials in the peel-off layer.

[8] The peel-off sheet described in any one of [1] to [7], wherein a logarithmic damping ratio ΔE of the peel-off layer, the logarithmic damping ratio ΔE being determined by subjecting the peel-off layer to rigid-body pendulum measurement at 100° C., is 0.25 or more.

[9] A peel-off sheet including a first substrate and a peel-off layer, wherein a logarithmic damping ratio ΔE of the peel-off layer, the logarithmic damping ratio ΔE being determined by subjecting the peel-off layer to rigid-body pendulum measurement at 100° C., is 0.25 or more.

[10] The peel-off sheet described in any one of [1] to [9], the peel-off sheet including a primer layer interposed between the first substrate and the peel-off layer.

[11] A peel-off sheet including a first substrate and a peel-off layer, the peel-off sheet including a structural component containing particles, wherein a particle size distribution of the particles contained in the structural component, the particle size distribution being determined with a laser diffraction scattering particle size distribution analyzer, has a maximum peak at a position of more than 0.2 μm and 5 μm or less.

[12] The peel-off sheet described in [11], wherein the structural component containing particles is the peel-off layer.

[13] The peel-off sheet described in [11] or [12], wherein the peel-off layer contains a vinyl chloride-vinyl acetate copolymer and a crystalline polyester.

[14] The peel-off sheet described in any one of [11] to [13], the peel-off sheet including an intermediate layer interposed between the first substrate and the peel-off layer.

[15] The peel-off sheet described in [14], wherein the structural component containing particles is the intermediate layer.

[16] The peel-off sheet described in [14] or [15], wherein the intermediate layer is a primer layer.

[17] A combination of the peel-off sheet described in any one of [1] to [16] and an intermediate transfer medium,
the intermediate transfer medium including a second substrate and a transfer layer including at least a receiving layer.

[18] The combination of the peel-off sheet and an intermediate transfer medium described in [17], wherein the receiving layer contains a vinyl chloride-vinyl acetate copolymer.

[19] The combination of the peel-off sheet and an intermediate transfer medium described in [17] or [18], wherein the receiving layer contains a polyester.

[20] The combination of the peel-off sheet and an intermediate transfer medium described in [19], wherein the polyester is a crystalline polyester.

[21] A method for producing a printed material, the method including the steps of providing the combination of the peel-off sheet and an intermediate transfer medium described in any one of [17] to [20]; performing thermocompression bonding between the receiving layer and the peel-off layer in at least a part of a removal region of the intermediate transfer medium and subsequently peeling off the transfer layer disposed in the removal region from the intermediate transfer medium; transferring the transfer layer disposed in a non-removal region of the intermediate transfer medium to a transfer-receiving article; and forming an image on the receiving layer prior to or subsequent to the step of peeling off the transfer layer and prior to the step of transferring the transfer layer.

EXAMPLES

The peel-off sheet, etc. according to the present disclosure are described in further detail with reference to Examples below. The peel-off sheet, etc. according to the present disclosure are not limited by Examples below. Hereinafter, "part" is on a mass basis unless otherwise specified, and "part" is expressed in units of mass in terms of solid content (except solvent).

First Peel-Off Sheet
[Production of Peel-Off Sheets]

Example 1A

A PET film having a thickness of 6 μm was provided as a first substrate. A primer layer-forming coating liquid having the composition described below was applied onto one of the surfaces of the PET film. The resulting coating film was dried to form a primer layer having a thickness of 0.3 μm. Then, a peel-off layer-forming coating liquid having the composition described below was applied to the primer layer. The resulting coating film was dried to form a peel-off layer having a thickness of 0.5 μm. Subsequently, a back layer-forming coating liquid having the composition described below was applied onto the other surface of the PET film. The resulting coating film was dried to form a back layer having a thickness of 0.5 μm. A peel-off sheet of Example 1A was produced in the above-described manner.

<Primer Layer-Forming Coating Liquid>
Polyester: 10 parts
("VYLON (registered trademark) 200" produced by Toyobo Co., Ltd.)
Methyl ethyl ketone (MEK): 25 parts
Toluene: 25 parts <Peel-Off Layer-Forming Coating Liquid>
Vinyl chloride-vinyl acetate copolymer A: 3 parts
("SOLBIN (registered trademark) CNL" produced by Nissin Chemical Industry Co., Ltd., Tg: 76° C., Mn: 16,000)
Crystalline polyester A: 7 parts
("VYLON (registered trademark) GA-6400 produced by Toyobo Co., Ltd., Tg: −20° C., melting point: 96° C., Mn: 30,000)
MEK: 25 parts
Toluene: 25 parts <Back Layer-Forming Coating Liquid>
Acrylic-modified silicone resin: 10 parts
("POLYALLOY NSA-X55" produced by NATOCO Co., Ltd.)
Silicone isocyanate: 2 parts
("DAIALLOMER (registered trademark) SP901" produced by Dainichiseika Color & Chemicals Mfg. Co., Ltd.)
MEK: 20 parts
Toluene: 20 parts Examples 2A to 16A and Comparative Examples 1A to 6A A peel-off sheet was produced as in Example 1A, except that the composition of the peel-off layer was changed as described in Table 1. In Example 8A, a PET film one of the surfaces of which had been subjected to an easy-adhesion treatment was used as a first substrate.

Details of each of the components described in Table 1 are as follows.
Vinyl chloride-vinyl acetate copolymer B: "SOLBIN (registered trademark) CL" produced by Nissin Chemical Industry Co., Ltd., Tg: 70° C., Mn: 25,000
Crystalline polyester B: "Nichigo-POLYESTER (registered trademark) SP-180" produced by Mitsubishi Chemical Corporation, Tg: 10° C., melting point: 110° C., Mn: 10,000

Amorphous polyester A: "VYLON (registered trademark) 200" produced by Toyobo Co., Ltd., Tg: 67° C., Mn: 17,000

Amorphous polyester B: "VYLON (registered trademark) GK680" produced by Toyobo Co., Ltd., Tg: 10° C., Mn: 6,000

(Meth)acrylic resin: "DIANAL (registered trademark) BR-87" produced by Mitsubishi Chemical Corporation Organic particles: "EPOSTAR (registered trademark) S6" produced by Nippon Shokubai Co., Ltd., melamine-formaldehyde condensate

[Production of Intermediate Transfer Medium (1)]

A PET film having a thickness of 12 μm was provided as a second substrate. A peeling layer-forming coating liquid having the composition described below was applied onto one of the surfaces of the PET film. The resulting coating film was dried to form a peeling layer having a thickness of 1.6 μm. Then, a protective layer-forming coating liquid having the composition described below was applied to the peeling layer. The resulting coating film was dried to form a protective layer having a thickness of 4 μm. Subsequently, a receiving layer-forming coating liquid (1) having the composition described below was applied to the protective layer. The resulting coating film was dried to form a receiving layer having a thickness of 2 μm. An intermediate transfer medium (1) was produced in the above-described manner. The peeling layer, the protective layer, and the receiving layer constitute the transfer layer of the intermediate transfer medium (1).

<Peeling Layer-Forming Coating Liquid>
  (Meth)acrylic resin: 95 parts
  ("DIANAL (registered trademark) BR-87" produced by Mitsubishi Chemical Corporation)
  Polyester: 5 parts
  ("VYLON (registered trademark) 200" produced by Toyobo Co., Ltd.)
  Melamine resin particles: 50 parts
  ("EPOSTAR (registered trademark) M30" produced by Nippon Shokubai Co., Ltd.)
  MEK: 300 parts
  Toluene: 300 parts <Protective Layer-Forming Coating Liquid>
  Polyester: 20 parts
  ("Elitel (registered trademark) UE-9885" produced by Unitika Ltd.)
  MEK: 40 parts
  Toluene: 40 parts <Receiving Layer-Forming Coating Liquid (1)>
  Vinyl chloride-vinyl acetate copolymer: 95 parts
  ("SOLBIN (registered trademark) CNL" produced by Nissin Chemical Industry Co., Ltd.)
  Epoxy-modified silicone oil: 5 parts
  ("KP-1800U" produced by Shin-Etsu Chemical Co., Ltd.)
  MEK: 200 parts
  Toluene: 200 parts

[Production of Intermediate Transfer Medium (2)]

An intermediate transfer medium (2) was produced as in the production of the intermediate transfer medium (1), except that the receiving layer-forming coating liquid (1) was changed to the receiving layer-forming coating liquid (2) described below.

<Receiving Layer-Forming Coating Liquid (2)>
  Vinyl chloride-vinyl acetate copolymer: 66.5 parts
  ("SOLBIN (registered trademark) CNL" produced by Nissin Chemical Industry Co., Ltd.)
  Amorphous polyester: 28.5 parts
  ("VYLON (registered trademark) GK250" produced by Toyobo Co., Ltd.)
  Epoxy-modified silicone oil: 5 parts
  ("KP-1800U" produced by Shin-Etsu Chemical Co., Ltd.)
  MEK: 200 parts
  Toluene: 200 parts

[Production of Intermediate Transfer Medium (3)]

An intermediate transfer medium (3) was produced as in the production of the intermediate transfer medium (1), except that the receiving layer-forming coating liquid (1) was changed to the receiving layer-forming coating liquid (3) described below.

<Receiving Layer-Forming Coating Liquid (3)>
  Vinyl chloride-vinyl acetate copolymer: 66.5 parts
  ("SOLBIN (registered trademark) CNL" produced by Nissin Chemical Industry Co., Ltd.)
  Crystalline polyester: 28.5 parts
  ("VYLON (registered trademark) GA-6400" produced by Toyobo Co., Ltd.)
  Epoxy-modified silicone oil: 5 parts
  ("KP-1800U" produced by Shin-Etsu Chemical Co., Ltd.)
  MEK: 200 parts
  Toluene: 200 parts <<Evaluation of Peel-Off Property>>

The peel-off sheets produced in Examples and Comparative Examples, the intermediate transfer media produced as described above, and a thermal transfer printer were provided.

The peel-off layer included in each of the peel-off sheets was superimposed on the receiving layer included in the corresponding one of the intermediate transfer media. Then, the peel-off sheet was heated from the back layer-side with a thermal head included in the thermal transfer printer described below in order to perform pressure-bonding. Subsequently, they were separated from each other in order to peel off a portion of the transfer layer of the intermediate transfer medium which was superimposed on the peel-off layer. The applied voltage was set to 21 V.

The removal region of the intermediate transfer medium was visually inspected. The peel-off property of the peel-off sheet was evaluated in accordance with the following evaluation criteria. Table 1 lists the evaluation results.

After the applied voltage was changed to 15 V, the same evaluation as described above was made. Table 1 lists the evaluation results (denoted as "15V(1)"). The peel-off sheet was stored in a 50° C. environment for 100 hours. The same evaluation as described above was made except that the stored peel-off sheet was used and the applied voltage was changed to 15 V. Table 1 lists the evaluation results (denoted as "15V(2)").

(Evaluation Criteria)

A: It was confirmed that the transfer layer disposed in the removal region of the intermediate transfer medium was removed with certainty.

B: A small portion of the transfer layer disposed in the removal region of the intermediate transfer medium remained.

C: A portion of the transfer layer disposed in the removal region of the intermediate transfer medium remained, but it did not cause problems in practical applications.

NG: A considerable portion of the transfer layer disposed in the removal region of the intermediate transfer medium remained, which caused problems in practical applications.

(Thermal Transfer Printer)

Thermal head: "KEE-57-12GAN2-STA" produced by KYOCERA Corporation

Heating element average resistance: 3303Ω

Character density in main scanning direction: 300 dpi
Character density in subscanning direction: 300 dpi
Period per line: 2.0 msec.
Print start temperature: 35° C.
Pulse duty ratio: 85%

<<Evaluation of Blocking Resistance>>

Each of the peel-off sheets (length: 25 m) produced in Examples and Comparative Examples was wound around a core having an outside diameter of 25 mm until the outside diameter of the resulting wound body reached 35 mm. The wound body was then left to stand in a 50° C. environment for 100 hours. Subsequently, the peel-off sheet was unwound. Blocking resistance was evaluated on the basis of ease of unwinding of the wound body in accordance with the following evaluation criteria. Table 1 lists the evaluation results.

(Evaluation Criteria)

A: It was possible to easily unwind the peel-off sheet.

B: Although the peel-off layer and the back layer were slightly stuck to each other, it was possible to unwind the peel-off sheet.

C: Although the peel-off layer and the back layer were stuck to each other, it was possible to unwind the peel-off sheet and problems did not occur in practical applications.

D: The peel-off layer and the back layer were heavily stuck to each other, and it was not possible to unwind the peel-off sheet.

<<Measurement of Logarithmic Damping Ratio ΔE>>

Each of the peel-off sheets produced in Examples and Comparative Examples was cut to a size of 15 mm wide×50 mm long to provide a test sample. Using the test sample, logarithmic damping ratio ΔE was measured in accordance with the above-described method under the condition where the temperature of the peel-off layer included in the test sample was 100° C. Table 1 lists the measurement results. RPT-3000W produced by A&D Company, Limited was used as a rigid-body pendulum physical property tester. Cooling/heating block CHB-100 was used as a test sample temperature control stage. Cylindrical cylinder edge RBP-060 was used as a cylindrical cylinder. FRB-100 was used as a pendulum frame.

TABLE 1

| | ΔE of peel-off layer (100° C.) | Vinyl chloride-vinyl acetate copolymer A | Vinyl chloride-vinyl acetate copolymer B | Crystalline polyester A | Crystalline polyester B | Amorphous polyester A | Amorphous polyester B | (Meth)acrylic resin |
|---|---|---|---|---|---|---|---|---|
| Example 1A | 0.33 | 30 | | 70 | | | | |
| Example 2A | 0.32 | 50 | | 50 | | | | |
| Example 3A | 0.26 | 70 | | 30 | | | | |
| Example 4A | 0.34 | 30 | | 70 | | | | |
| Example 5A | 0.33 | 50 | | 50 | | | | |
| Example 6A | 0.34 | 50 | | 50 | | | | |
| Example 7A | 0.33 | | 50 | 50 | | | | |
| Example 8A | 0.4 | 20 | | 80 | | | | |
| Example 9A | 0.32 | 30 | | | 70 | | | |
| Example 10A | 0.33 | 30 | | | 70 | | | |
| Example 11A | 0.36 | 10 | | | 90 | | | |
| Example 12A | 0.37 | 10 | | | 90 | | | |
| Example 13A | 0.37 | 10 | | | 90 | | | |
| Example 14A | 0.37 | 10 | | | 90 | | | |
| Example 15A | 0.26 | 70 | | 30 | | | | |
| Example 16A | 0.26 | 70 | | 30 | | | | |
| Comparative example 1A | 0.21 | 50 | | | | 50 | | |
| Comparative example 2A | 0.2 | 30 | | | | 70 | | |
| Comparative example 3A | 0.2 | | | | | 100 | | |
| Comparative example 4A | 0.21 | 100 | | | | | | |
| Comparative example 5A | 0.18 | | | | | | | 100 |
| Comparative example 6A | 0.2 | | | | | | 100 | |

| | Content of organic particles relative to total content of resin materials in peel-off layer (mass part) | Intermediate transfer medium | Peel-off property evaluation 21 V | Peel-off property evaluation 15 V (1) | Peel-off property evaluation 15 V (2) | Blocking resistance evaluation |
|---|---|---|---|---|---|---|
| Example 1A | — | (1) | A | A | B | C |
| Example 2A | — | (1) | A | B | C | B |
| Example 3A | — | (1) | A | C | C | A |
| Example 4A | 5 | (1) | A | A | B | B |
| Example 5A | 5 | (1) | A | B | C | A |
| Example 6A | 10 | (1) | A | A | B | A |
| Example 7A | 5 | (1) | A | B | C | A |
| Example 8A | — | (1) | A | A | B | C |
| Example 9A | — | (1) | A | B | C | B |
| Example 10A | 10 | (1) | A | A | B | A |

TABLE 1-continued

| | | | | | | |
|---|---|---|---|---|---|---|
| Example 11A | 10 | (1) | A | A | A | A |
| Example 12A | 20 | (1) | A | A | A | A |
| Example 13A | 20 | (2) | A | A | A | A |
| Example 14A | 20 | (3) | A | A | A | A |
| Example 15A | — | (2) | A | B | C | A |
| Example 16A | — | (3) | A | B | B | A |
| Comparative example 1A | — | (1) | A | NG | — | A |
| Comparative example 2A | — | (1) | A | NG | — | A |
| Comparative example 3A | — | (1) | A | NG | — | A |
| Comparative example 4A | — | (1) | A | NG | — | A |
| Comparative example 5A | — | (1) | A | NG | — | A |
| Comparative example 6A | — | (1) | A | NG | — | A |

Second Peel-Off Sheet

The particle sizes described as for the organic particles and inorganic particles are each particle size that corresponds to the maximum peak portion of the particles which is determined by the method for calculating maximum peak. In the peel-off sheets produced in Examples and Comparative Examples, the thickness of the primer layer was 0.3 µm.

[Production of Peel-Off Sheets]

Example 1B

A PET film having a thickness of 6 µm was provided as a first substrate. A primer layer-forming coating liquid 1 having the composition described below was applied onto one of the surfaces of the PET film. The resulting coating film was dried to form a primer layer. Then, a peel-off layer-forming coating liquid 1 having the composition described below was applied to the primer layer. The resulting coating film was dried to form a peel-off layer having a thickness of 0.5 µm. Subsequently, a back layer-forming coating liquid having the composition described below was applied onto the other surface of the PET film. The resulting coating film was dried to form a back layer having a thickness of 0.5 µm. A peel-off sheet of Example 1B was produced in the above-described manner.

<Primer Layer-Forming Coating Liquid 1>
Polyester: 100 parts
("VYLON (registered trademark) 200" produced by Toyobo Co., Ltd.)
Organic particles (particle size: 0.4 µm): 10 parts
("EPOSTAR (registered trademark) S6" produced by Nippon Shokubai Co., Ltd.)
MEK: 250 parts
Toluene: 250 parts <Peel-Off Layer-Forming Coating Liquid 1>
Vinyl chloride-vinyl acetate copolymer: 5 parts
("SOLBIN (registered trademark) CNL" produced by Nissin Chemical Industry Co., Ltd.)
Crystalline polyester: 5 parts
("Nichigo-POLYESTER (registered trademark) SP-180" produced by Mitsubishi Chemical Corporation)
Organic particles (particle size: 0.4 µm): 1 part
("EPOSTAR (registered trademark) S6" produced by Nippon Shokubai Co., Ltd.)
MEK: 25 parts
Toluene: 25 parts <Back Layer-Forming Coating Liquid>
Acrylic-modified silicone resin: 10 parts
("POLYALLOY NSA-X55" produced by NATOCO Co., Ltd.)
Silicone isocyanate: 2 parts
("DAIALLOMER (registered trademark) SP901" produced by Dainichiseika Color & Chemicals Mfg. Co., Ltd.)
MEK: 20 parts
Toluene: 20 parts Example 2B A peel-off sheet of Example 2B was produced as in Example 1B, except that a peel-off layer having a thickness of 0.5 µm was formed using a peel-off layer-forming coating liquid 2 having the composition described below instead of the peel-off layer-forming coating liquid 1.

<Peel-Off Layer-Forming Coating Liquid 2>
Vinyl chloride-vinyl acetate copolymer: 5 parts
("SOLBIN (registered trademark) CNL" produced by Nissin Chemical Industry Co., Ltd.)
Crystalline polyester: 5 parts
("Nichigo-POLYESTER (registered trademark) SP-180" produced by Mitsubishi Chemical Corporation)
MEK: 25 parts
Toluene: 25 parts Example 3B A peel-off sheet of Example 3B was produced as in Example 1B, except that a primer layer was formed using a primer layer-forming coating liquid 2 having the composition described below instead of the primer layer-forming coating liquid 1, and a peel-off layer having a thickness of 0.5 µm was formed using a peel-off layer-forming coating liquid 3 having the composition described below instead of the peel-off layer-forming coating liquid 1. The peel-off layer of the peel-off sheet produced in Example 3B contained two types of particles. The particle size corresponding to the maximum peak portion was 0.4 µm.

<Primer Layer-Forming Coating Liquid 2>
Polyester: 100 parts
("VYLON (registered trademark) 200" produced by Toyobo Co., Ltd.)
MEK: 250 parts
Toluene: 250 parts <Peel-Off Layer-Forming Coating Liquid 3>
Vinyl chloride-vinyl acetate copolymer: 5 parts
("SOLBIN (registered trademark) CNL" produced by Nissin Chemical Industry Co., Ltd.)

Crystalline polyester: 5 parts
("Nichigo-POLYESTER (registered trademark) SP-180" produced by Mitsubishi Chemical Corporation)
Organic particles (particle size: 0.1 µm) 0.5 parts
("EPOSTAR (registered trademark) SS" produced by Nippon Shokubai Co., Ltd.)
Organic particles (particle size: 0.4 µm): 1 part
("EPOSTAR (registered trademark) S6" produced by Nippon Shokubai Co., Ltd.)
MEK: 25 parts
Toluene: 25 parts Example 4B A peel-off sheet of Example 4B was produced as in Example 1B, except that a primer layer was formed using the primer layer-forming coating liquid 2 having the composition described above instead of the primer layer-forming coating liquid 1, and a peel-off layer having a thickness of 0.5 µm was formed using a peel-off layer-forming coating liquid 4 having the composition described below instead of the peel-off layer-forming coating liquid 1.
<Peel-Off Layer-Forming Coating Liquid 4>
Vinyl chloride-vinyl acetate copolymer: 5 parts
("SOLBIN (registered trademark) CNL" produced by Nissin Chemical Industry Co., Ltd.)
Crystalline polyester: 5 parts
("Nichigo-POLYESTER (registered trademark) SP-180" produced by Mitsubishi Chemical Corporation)
Organic particles (particle size: 0.4 µm): 2 parts
("EPOSTAR (registered trademark) S6" produced by Nippon Shokubai Co., Ltd.)
MEK: 25 parts
Toluene: 25 parts Example 5B A peel-off sheet of Example 5B was produced as in Example 1B, except that a primer layer was formed using the primer layer-forming coating liquid 2 having the composition described above instead of the primer layer-forming coating liquid 1, and a peel-off layer having a thickness of 0.5 µm was formed using a peel-off layer-forming coating liquid 5 having the composition described below instead of the peel-off layer-forming coating liquid 1.
<Peel-Off Layer-Forming Coating Liquid 5>
Vinyl chloride-vinyl acetate copolymer: 1 part
("SOLBIN (registered trademark) CNL" produced by Nissin Chemical Industry Co., Ltd.)
Crystalline polyester: 9 parts
("Nichigo-POLYESTER (registered trademark) SP-180" produced by Mitsubishi Chemical Corporation)
Organic particles (particle size: 0.4 µm): 2 parts
("EPOSTAR (registered trademark) S6" produced by Nippon Shokubai Co., Ltd.)
MEK: 25 parts
Toluene: 25 parts Example 6B A peel-off sheet of Example 6B was produced as in Example 1B, except that a primer layer was formed using the primer layer-forming coating liquid 2 having the composition described above instead of the primer layer-forming coating liquid 1, and a peel-off layer having a thickness of 0.3 µm was formed using the peel-off layer-forming coating liquid 1 having the composition described above.

Example 7B

A peel-off sheet of Example 7B was produced as in Example 1B, except that a primer layer was formed using the primer layer-forming coating liquid 2 having the composition described above instead of the primer layer-forming coating liquid 1.

Example 8B

A peel-off sheet of Example 8B was produced as in Example 1B, except that a primer layer was formed using the primer layer-forming coating liquid 2 having the composition described above instead of the primer layer-forming coating liquid 1, and a peel-off layer having a thickness of 0.8 µm was formed using the peel-off layer-forming coating liquid 1 having the composition described above.

Example 9B

A peel-off sheet of Example 9B was produced as in Example 1B, except that a primer layer was formed using the primer layer-forming coating liquid 2 having the composition described above instead of the primer layer-forming coating liquid 1, and a peel-off layer having a thickness of 0.5 µm was formed using a peel-off layer-forming coating liquid 6 having the composition described below instead of the peel-off layer-forming coating liquid 1.
<Peel-Off Layer-Forming Coating Liquid 6>
Vinyl chloride-vinyl acetate copolymer: 5 parts
("SOLBIN (registered trademark) CNL" produced by Nissin Chemical Industry Co., Ltd.)
Crystalline polyester: 5 parts
("Nichigo-POLYESTER (registered trademark) SP-180" produced by Mitsubishi Chemical Corporation)
Organic particles (particle size: 1.2 µm): 1 part
("EPOSTAR (registered trademark) S12" produced by Nippon Shokubai Co., Ltd.)
MEK: 25 parts
Toluene: 25 parts Example 10B A peel-off sheet of Example 10B was produced as in Example 1B, except that a primer layer was formed using a primer layer-forming coating liquid 3 having the composition described below instead of the primer layer-forming coating liquid 1.
<Primer Layer-Forming Coating Liquid 3>
Polyester: 100 parts
("VYLON (registered trademark) 200" produced by Toyobo Co., Ltd.)
Organic particles (particle size: 1.2 µm): 10 parts
("EPOSTAR (registered trademark) S12" produced by Nippon Shokubai Co., Ltd.)
MEK: 250 parts
Toluene: 250 parts Example 11B A peel-off sheet of Example 11B was produced as in Example 1B, except that a peel-off layer having a thickness of 0.5 µm was formed using a peel-off layer-forming coating liquid 7 having the composition described below instead of the peel-off layer-forming coating liquid 1.
<Peel-Off Layer-Forming Coating Liquid 7>
Vinyl chloride-vinyl acetate copolymer: 5 parts
("SOLBIN (registered trademark) CNL" produced by Nissin Chemical Industry Co., Ltd.)
Crystalline polyester: 5 parts
("Nichigo-POLYESTER (registered trademark) SP-180" produced by Mitsubishi Chemical Corporation)
Inorganic particles (particle size: 2.7 μm): 1 part
("SYLYSIA (registered trademark) 310P" produced by Fuji Silysia Chemical, Ltd.)
MEK: 25 parts
Toluene: 25 parts Example 12B A peel-off sheet of Example 12B was produced as in Example 1B, except that a primer layer was formed using the primer layer-forming coating liquid 2 having the composition described above instead of the primer layer-forming coating liquid 1, and a peel-off layer having a thickness of 2 μm was formed using the peel-off layer-forming coating liquid 1.

Example 13B

A peel-off sheet of Example 13B was produced as in Example 1B, except that a peel-off layer having a thickness of 2 μm was formed using the peel-off layer-forming coating liquid 2 having the composition described above instead of the peel-off layer-forming coating liquid 1.

Example 14B

A peel-off sheet of Example 14B was produced as in Example 1B, except that a primer layer was formed using the primer layer-forming coating liquid 2 having the composition described above instead of the primer layer-forming coating liquid 1, and a peel-off layer having a thickness of 0.5 μm was formed using a peel-off layer-forming coating liquid 8 having the composition described below instead of the peel-off layer-forming coating liquid 1.
<Peel-Off Layer-Forming Coating Liquid 8>
Vinyl chloride-vinyl acetate copolymer: 4 parts
("SOLBIN (registered trademark) CNL" produced by Nissin Chemical Industry Co., Ltd.)
Polyester: 6 parts
("VYLON (registered trademark) GA-6400" produced by Toyobo Co., Ltd.)
Organic particles (particle size: 0.4 μm): 2 parts
("EPOSTAR (registered trademark) S6" produced by Nippon Shokubai Co., Ltd.)
MEK: 25 parts
Toluene: 25 parts Example 15B A peel-off sheet of Example 15B was produced as in Example 1B, except that a peel-off layer having a thickness of 0.5 μm was formed using a peel-off layer-forming coating liquid 9 having the composition described below instead of the peel-off layer-forming coating liquid 1.
<Peel-Off Layer-Forming Coating Liquid 9>
Vinyl chloride-vinyl acetate copolymer: 10 parts
("SOLBIN (registered trademark) CNL" produced by Nissin Chemical Industry Co., Ltd.)
Organic particles (particle size: 0.4 μm): 1 part
("EPOSTAR (registered trademark) S6" produced by Nippon Shokubai Co., Ltd.)
MEK: 25 parts
Toluene: 25 parts Example 16B A peel-off sheet of Example 16B was produced as in Example 1B, except that a peel-off layer having a thickness of 0.5 μm was formed using a peel-off layer-forming coating liquid 10 having the composition described below instead of the peel-off layer-forming coating liquid 1.
<Peel-Off Layer-Forming Coating Liquid 10>
(Meth)acrylic resin: 10 parts
("DIANAL (registered trademark) BR-87" produced by Mitsubishi Chemical Corporation)
Organic particles (particle size: 0.4 μm): 1 part
("EPOSTAR (registered trademark) S6" produced by Nippon Shokubai Co., Ltd.)
MEK: 25 parts
Toluene: 25 parts Reference Example 1B A peel-off sheet of Reference Example 1B was produced as in Example 1R, except that a primer layer was formed using the primer layer-forming coating liquid 2 having the composition described above instead of the primer layer-forming coating liquid 1, and a peel-off layer having a thickness of 0.5 μm was formed using the peel-off layer-forming coating liquid 2 having the composition described above instead of the peel-off layer-forming coating liquid 1.

Reference Example 2B

A peel-off sheet of Reference Example 2B was produced as in Example 1B, except that a primer layer was formed using a primer layer-forming coating liquid 4 having the composition described below instead of the primer layer-forming coating liquid 1, and a peel-off layer having a thickness of 0.5 μm was formed using the peel-off layer-forming coating liquid 2 having the composition described above instead of the peel-off layer-forming coating liquid 1.
<Primer Layer-Forming Coating Liquid 4>
Polyvinylpyrrolidone: 9 parts
("PVP K-90" produced by ISP Japan, Ltd.)
inorganic particles (particle size: 0.2 μm or less): 1 part
("ALUMINASOL 200" produced by Nissan Chemical Industries, Ltd.)
Water: 90 parts
Isopropyl alcohol: 90 parts Reference Example 3B A peel-off sheet of Reference Example 3B was produced as in Example 1B, except that a primer layer was formed using the primer layer-forming coating liquid 2 having the composition described above instead of the primer layer-forming coating liquid 1, and a peel-off layer having a thickness of 0.5 μm was formed using a peel-off layer-forming coating liquid 11 having the composition described below instead of the peel-off layer-forming coating liquid 1.
<Peel-Off Layer-Forming Coating Liquid 11>
Vinyl chloride-vinyl acetate copolymer: 5 parts
("SOLBIN (registered trademark) CNL" produced by Nissin Chemical Industry Co., Ltd.)

Crystalline polyester: 5 parts
("Nichigo-POLYESTER (registered trademark) SP-180" produced by Mitsubishi Chemical Corporation)
Organic particles (particle size: 9 μm): 1 part
("EPOSTAR (registered trademark) L15" produced by Nippon Shokubai Co., Ltd.)
MEK: 25 parts
Toluene: 25 parts Reference Example 4B A peel-off sheet of Reference Example 4B was produced as in Example 1B, except that a primer layer was formed using a primer layer-forming coating liquid 5 having the composition described below instead of the primer layer-forming coating liquid 1, and a peel-off layer having a thickness of 0.5 μm was formed using the peel-off layer-forming coating liquid 2 having the composition described above instead of the peel-off layer-forming coating liquid 1.
<Primer Layer-Forming Coating Liquid 5>
Polyester: 100 parts
("VYLON (registered trademark) 200" produced by Toyobo Co., Ltd.)
Organic particles (particle size: 9 μm): 10 parts
("EPOSTAR (registered trademark) L15" produced by Nippon Shokubai Co., Ltd.)
MEK: 250 parts
Toluene: 250 parts Comparative Example 1B A peel-off sheet of Comparative Example 1B was produced as in Example 1B, except that a primer layer was formed using the primer layer-forming coating liquid 2 having the composition described above instead of the primer layer-forming coating liquid 1, and a peel-off layer having a thickness of 0.5 μm was formed using a peel-off layer-forming coating liquid 12 having the composition described below instead of the peel-off layer-forming coating liquid 1.
<Peel-Off Layer-Forming Coating Liquid 12>
Vinyl chloride-vinyl acetate copolymer: 10 parts
("SOLBIN (registered trademark) CNL" produced by Nissin Chemical Industry Co., Ltd.)
MEK: 25 parts
Toluene: 25 parts Comparative Example 2B A peel-off sheet of Comparative Example 2B was produced as in Example 1B, except that a primer layer was formed using the primer layer-forming coating liquid 2 having the composition described above instead of the primer layer-forming coating liquid 1, and a peel-off layer having a thickness of 0.5 μm was formed using a peel-off layer-forming coating liquid 13 having the composition described below instead of the peel-off layer-forming coating liquid 1.
<Peel-Off Layer-Forming Coating Liquid 13>
(Meth)acrylic resin: 10 parts
("DIANAL (registered trademark) BR-87" produced by Mitsubishi Chemical Corporation)
MEK: 25 parts
Toluene: 25 parts
[Production of Intermediate Transfer Medium]
A PET film (Lumirror (registered trademark) produced by Toray Industries, Inc.) having a thickness of 12 μm was provided as a second substrate. A peeling layer-forming coating liquid having the composition described below was applied onto one of the surfaces of the PET film. The resulting coating film was dried to form a peeling layer having a thickness of 1.6 μm. Then, a protective layer-forming coating liquid having the composition described below was applied to the peeling layer. The resulting coating film was dried to form a protective layer having a thickness of 4 μm. Subsequently, a receiving layer-forming coating liquid having the composition described below was applied to the protective layer. The resulting coating film was dried to form a receiving layer having a thickness of 2 μm. An intermediate transfer medium was produced in the above-described manner. The peeling layer, the protective layer, and the receiving layer constitute the transfer layer of the intermediate transfer medium.
<Peeling Layer-Forming Coating Liquid>
(Meth)acrylic resin: 95 parts
("DIANAL (registered trademark) BR-87" produced by Mitsubishi Chemical Corporation)
Polyester: 5 parts
("VYLON (registered trademark) 200" produced by Toyobo Co., Ltd.)
Melamine resin particles: 50 parts
("EPOSTAR (registered trademark) M30" produced by Nippon Shokubai Co., Ltd.)
MEK: 300 parts
Toluene: 300 parts
<Protective Layer-Forming Coating Liquid>
Polyester: 20 parts
("Elitel (registered trademark) UE-9885" produced by Unitika Ltd.)
MEK: 40 parts
Toluene: 40 parts
<Receiving Layer-Forming Coating Liquid>
Vinyl chloride-vinyl acetate copolymer: 95 parts
("SOLBIN (registered trademark) CNL" produced by Nissin Chemical Industry Co., Ltd.)
Epoxy-modified silicone oil: 5 parts
("KP-1800U" produced by Shin-Etsu Chemical Co., Ltd.)
MEK: 200 parts
Toluene: 200 parts
<<Evaluation of Peel-Off Property>>
A thermal transfer image was formed on the receiving layer of the intermediate transfer medium by a sublimation thermal transfer method. Then, the receiving layer of the intermediate transfer medium on which the thermal transfer image had been formed and the peel-off layer of one of the peel-off sheets produced in Examples 1B to 16B, Reference Examples 1B to 4B, and Comparative examples 1B and 2B were superimposed on each other so as to come into contact with each other. Subsequently, energy was applied to a part of the peel-off sheet with the thermal transfer printer described below under the following printing conditions in order to remove a part of the transfer layer of the intermediate transfer medium. The peel-off property was evaluated in accordance with the following evaluation criteria. Table 2 lists the evaluation results.

The peel-off sheets produced in Examples 1B to 14B and Reference Examples 1B to 4B were evaluated under the condition of Applied voltage 1 (the column "Peel-off property evaluation 1" in Table 2). In Examples 1B to 14B, the results of the peel-off property evaluation 1 at 13 V were more excellent than in Reference Examples 1B to 4B. The peel-off sheets produced in Examples 15B and 16B and Comparative Examples 1B and 2B were evaluated under the condition of Applied voltage 2 below (the column "Peel-off property evaluation 2" in Table 2).

(Thermal Transfer Printer)

Thermal head: "KEE-57-12GAN2-STA" produced by KYOCERA Corporation

Heating element average resistance: 3303Ω
Character density in main scanning direction: 300 dpi
Character density in subscanning direction: 300 dpi
Period per line: 2.0 msec.
Print start temperature: 35° C.
Pulse duty ratio: 85%
Applied voltage 1: 13, 15, and 17 V
Applied voltage 2: 15, 17, and 21 V (Evaluation Criteria)

5: It was confirmed that the transfer layer disposed in the removal region of the intermediate transfer medium was removed with certainty.

4: A small portion of the transfer layer disposed in the removal region of the intermediate transfer medium remained.

3: A portion of the transfer layer disposed in the removal region of the intermediate transfer medium remained, but it did not cause problems in practical applications.

2: A considerable portion of the transfer layer disposed in the removal region of the intermediate transfer medium remained, which caused problems in practical applications.

1: It was not possible to remove the removal region of the intermediate transfer medium.

<<Evaluation of Blocking Resistance>>

Each of the peel-off sheets (length: 25 m) produced in Examples and Comparative Examples was wound around a core having an outside diameter of 25 mm until the outside diameter of the resulting wound body reached 35 mm. The wound body was then left to stand in a 50° C. environment for 100 hours. Subsequently, the peel-off sheet was unwound. Blocking resistance was evaluated on the basis of ease of unwinding of the wound body in accordance with the following evaluation criteria. Table 2 lists the evaluation results.

(Evaluation Criteria)

A: It was possible to easily unwind the peel-off sheet.

B: Although the peel-off layer and the back layer were slightly stuck to each other, it was possible to unwind the peel-off sheet.

C: Although the peel-off layer and the back layer were stuck to each other, it was possible to unwind the peel-off sheet and problems did not occur in practical applications.

D: The peel-off layer and the back layer were heavily stuck to each other, and it was not possible to unwind the peel-off sheet.

TABLE 2

| | Peel-off property evaluation 1 | | | Peel-off property evaluation 2 | | | Blocking resistance |
|---|---|---|---|---|---|---|---|
| | 13 V | 15 V | 17 V | 15 V | 17 V | 21 V | |
| Example 1B | 4 | 5 | 5 | — | — | — | A |
| Example 2B | 3 | 4 | 5 | — | — | — | B |
| Example 3B | 4 | 5 | 5 | — | — | — | A |
| Example 4B | 5 | 5 | 5 | — | — | — | A |
| Example 5B | 5 | 5 | 5 | — | — | — | A |
| Example 6B | 5 | 5 | 5 | — | — | — | A |
| Example 7B | 4 | 5 | 5 | — | — | — | A |
| Example 8B | 4 | 5 | 5 | — | — | — | A |
| Example 9B | 5 | 5 | 5 | — | — | — | A |
| Example 10B | 4 | 5 | 5 | — | — | — | C |
| Example 11B | 5 | 5 | 5 | — | — | — | A |
| Example 12B | 3 | 5 | 5 | — | — | — | A |
| Example 13B | 3 | 4 | 5 | — | — | — | B |
| Example 14B | 5 | 5 | 5 | — | — | — | A |
| Example 15B | — | — | — | 3 | 4 | 5 | A |
| Example 16B | — | — | — | 3 | 4 | 5 | A |
| Comparative example 1B | — | — | — | 1 | 3 | 5 | A |
| Comparative example 2B | — | — | — | 1 | 3 | 5 | A |

REFERENCE SIGNS LIST

10: FIRST PEEL-OFF SHEET
11: FIRST SUBSTRATE
12: PEEL-OFF LAYER
13: PRIMER LAYER
14: COLORING LAYER
15: BACK LAYER
20: INTERMEDIATE TRANSFER MEDIUM
21: SECOND SUBSTRATE
22: RECEIVING LAYER
23: TRANSFER LAYER
24: PEELING LAYER
25: RELEASE LAYER
26: PROTECTIVE LAYER
30: PRINTED MATERIAL
31: TRANSFER-RECEIVING ARTICLE
1: FIRST SUBSTRATE
3: PEEL-OFF LAYER
4: INTERMEDIATE LAYER
5: BACK LAYER
P: PARTICLES (SPECIFIC PARTICLES)
100: SECOND PEEL-OFF SHEET
110: SECOND SUBSTRATE
150: TRANSFER LAYER
200: INTERMEDIATE TRANSFER MEDIUM
A: RIGID-BODY PENDULUM PHYSICAL PROPERTY TESTER
B: TEST SAMPLE TEMPERATURE CONTROL STAGE
C: CYLINDRICAL CYLINDER
D: PENDULUM FRAME
E: OSCILLATION DISPLACEMENT SENSOR
S: TEST SAMPLE

The invention claimed is:

1. A peel-off sheet comprising:
a first substrate; and
a peel-off layer,
wherein the peel-off layer contains a vinyl chloride-vinyl acetate copolymer, a crystalline polyester, and organic particles,
wherein the crystalline polyester has a melting point in a range of 50° C. or more to 150° C. or less, and
wherein a content of the organic particles in the peel-off layer is in a range of 10 parts by mass or more to 20 parts by mass or less relative to 100 parts by mass of total content of resin materials in the peel-off layer.

2. The peel-off sheet according to claim 1, wherein the crystalline polyester has a glass-transition temperature of −50° C. or more and 50° C. or less.

3. The peel-off sheet according to claim 1, wherein the crystalline polyester has a number-average molecular weight in a range of 10,000 or more to 50,000 or less.

4. The peel-off sheet according to claim 1, wherein a content of the crystalline polyester in the peel-off layer is in a range of 20 parts by mass or more to 95 parts by mass or less relative to 100 parts by mass of a total content of the vinyl chloride-vinyl acetate copolymer and the crystalline polyester in the peel-off layer.

5. The peel-off sheet according to claim 1, wherein a logarithmic damping ratio ΔE of the peel-off layer, the logarithmic damping ratio ΔE being determined by subjecting the peel-off layer to rigid-body pendulum measurement at 100° C., is 0.25 or more.

6. A peel-off sheet comprising:
a first substrate; and
a peel-off layer,
wherein the peel-off layer contains a crystalline polyester and organic particles,
wherein a logarithmic damping ratio ΔE of the peel-off layer, the logarithmic damping ratio ΔE being determined by subjecting the peel-off layer to rigid-body pendulum measurement at 100° C., is 0.25 or more,
wherein the crystalline polyester has a melting point in a range of 50° C. or more to 150° C. or less, and
wherein a content of the organic particles in the peel-off layer is in a range of 10 parts by mass or more to 20 parts by mass or less relative to 100 parts by mass of total content of resin materials in the peel-off layer.

7. The peel-off sheet according to claim 1, the peel-off sheet comprising a primer layer interposed between the first substrate and the peel-off layer.

8. A peel-off sheet comprising:
a first substrate; and
a peel-off layer,
wherein the peel-off sheet comprises a structural component containing particles,
wherein the structural component containing particles is the peel-off layer,
wherein the peel-off layer contains a vinyl chloride-vinyl acetate copolymer, a crystalline polyester, and organic particles,
wherein the crystalline polyester has a melting point in a range of 50° C. or more to 150° C. or less,
wherein a particle size distribution of the particles contained in the structural component, the particle size distribution being determined with a laser diffraction scattering particle size distribution analyzer, has a maximum peak at a position of more than 0.2 µm and 5 µm or less, and
wherein a content of the organic particles in the peel-off layer is in a range of 10 parts by mass or more to 20 parts by mass or less relative to 100 parts by mass of total content of resin materials in the peel-off layer.

9. The peel-off sheet according to claim 8, the peel-off sheet comprising an intermediate layer interposed between the first substrate and the peel-off layer.

10. The peel-off sheet according to claim 9, wherein the intermediate layer is a primer layer.

11. A combination of the peel-off sheet according to claim 1 and an intermediate transfer medium,
wherein the intermediate transfer medium comprises a second substrate and a transfer layer comprising at least a receiving layer.

12. The combination of the peel-off sheet and an intermediate transfer medium according to claim 11, wherein the receiving layer contains a vinyl chloride-vinyl acetate copolymer.

13. The combination of the peel-off sheet and an intermediate transfer medium according to claim 11, wherein the receiving layer contains a receiving layer polyester.

14. The combination of the peel-off sheet and an intermediate transfer medium according to claim 13, wherein the receiving layer polyester is a crystalline polyester, and
wherein the receiving layer crystalline polyester has a melting point in a range of 50° C. or more to 150° C. or less.

15. The peel-off sheet according to claim 1, wherein the organic particles are made of a resin.

16. The peel-off sheet according to claim 15, wherein the resin is at least one selected from the group consisting of a melamine resin, a benzoguanamine resin, a (meth)acrylic resin, a polyamide, a fluororesin, a phenolic resin, a styrene resin, a polyolefin, a silicone resin, and a copolymer of monomers constituting said resins.

17. The peel-off sheet according to claim 6, wherein the organic particles are made of a resin.

18. The peel-off sheet according to claim 17, wherein the resin is at least one selected from the group consisting of a melamine resin, a benzoguanamine resin, a (meth)acrylic resin, a polyamide, a fluororesin, a phenolic resin, a styrene resin, a polyolefin, a silicone resin, and a copolymer of monomers constituting said resins.

19. The peel-off sheet according to claim 8, wherein the particles are made of a resin.

20. The peel-off sheet according to claim 19, wherein the resin is at least one selected from the group consisting of a melamine resin, a benzoguanamine resin, a (meth)acrylic resin, a polyamide, a fluororesin, a phenolic resin, a styrene resin, a polyolefin, a silicone resin, and a copolymer of monomers constituting said resins.

* * * * *